US012711886B2

(12) United States Patent
Choi et al.

(10) Patent No.: US 12,711,886 B2
(45) Date of Patent: Aug. 18, 2026

(54) DISPLAY DEVICE, GATE DRIVING CIRCUIT AND DISPLAY DRIVING METHOD

(71) Applicant: LG Display Co., Ltd., Seoul (KR)

(72) Inventors: Jisu Choi, Paju-si (KR); Jinwoo Lee, Paju-si (KR); Kyunghyun Lim, Paju-si (KR)

(73) Assignee: LG Display Co., Ltd. (KR)

( * ) Notice: Subject to any disclaimer, the term of this patent is extended or adjusted under 35 U.S.C. 154(b) by 164 days.

(21) Appl. No.: 18/486,565

(22) Filed: Oct. 13, 2023

(65) Prior Publication Data

US 2024/0169874 A1 May 23, 2024

(30) Foreign Application Priority Data

Nov. 23, 2022 (KR) ........................ 10-2022-0157927

(51) Int. Cl.
*G09G 3/20* (2006.01)

(52) U.S. Cl.
CPC ........... *G09G 3/20* (2013.01); *G09G 2310/08* (2013.01); *G09G 2330/021* (2013.01); *G09G 2330/10* (2013.01)

(58) Field of Classification Search
CPC ................. G09G 3/20; G09G 2310/08; G09G 2330/021; G09G 2330/10; G09G 3/3233; G09G 3/3266; G09G 3/006; G09G 3/2074; G09G 3/3208; G09G 2310/0202; G09G 2320/029; G09G 2330/12
See application file for complete search history.

(56) References Cited

U.S. PATENT DOCUMENTS

2018/0233077 A1* 8/2018 Fletcher ............... G09G 3/2092
2019/0279585 A1* 9/2019 Suzuki ..................... G09G 3/20
2022/0199034 A1* 6/2022 Yun ........................ G11C 19/28

FOREIGN PATENT DOCUMENTS

KR 20220086869 A 6/2022

OTHER PUBLICATIONS

Office Action in Korean Appln. No. 10-2022-0157927, mailed on Mar. 16, 2026, 20 pages (with English translation).

* cited by examiner

*Primary Examiner* — Jonathan A Boyd
(74) *Attorney, Agent, or Firm* — Fish & Richardson P.C.

(57) ABSTRACT

A display device includes a display panel in which a plurality of gate lines are arranged in a first direction, and a plurality of subpixel arrays each including a plurality of subpixels are arranged in the first direction; a gate driving circuit including a first gate driving circuit located in one edge of the display panel and a second gate driving circuit located in another edge of the display panel, the first gate driving circuit and the second gate driving circuit sharing one gate line connected to one subpixel array; and a timing controller for controlling the gate driving circuit to operate in a defect detecting mode to detect a defect in the display panel during a blank periods in which at least one of the plurality of subpixels of the display panel does not emit light.

18 Claims, 19 Drawing Sheets

DISPLAY DEVICE, GATE DRIVING CIRCUIT AND DISPLAY DRIVING METHOD

CROSS-REFERENCE TO RELATED APPLICATION

This application claims the priority of Korean Patent Application No. 10-2022-0157927, filed on Nov. 23, 2022, which is hereby incorporated by reference in its entirety.

BACKGROUND

Field of the Disclosure

The present disclosure relates to electronic devices, and more specifically, to a display device, a gate driving circuit, and a display driving method that are capable of effectively detecting a defect in a display panel.

Description of the Background

As the information society has developed, there are increasing needs for display devices displaying images. Recently, various types of display devices, such as a liquid crystal display device, an organic light emitting display device, a quantum dot display device, and the like, have been developed and utilized.

Among these display devices, the organic light emitting display device uses an organic light emitting diode, which is a self-emissive element, and thereby, has features of fast response speed, high contrast ratio, high luminous efficiency, high luminance, wide viewing angle, and the like.

Display devices may include light emitting elements disposed in each of a plurality of subpixels SP arranged in a display panel. The display devices may enable these light emitting elements to emit light by controlling a current flowing through, or a voltage applied to, the light emitting element, and thereby, display an intended image by controlling luminance of light emitted from each subpixel.

In typical display devices, a process of inspecting whether a display panel has a defect before being rolled out or a process of detecting a defect in the display panel during being used after having been rolled out may be performed.

For example, before a display device is rolled out, a data signal for inspection may be supplied to data lines through a driving transistor turned on in response to a scan signal generated by a gate driving circuit, and whether a display panel has a defect may be determined by inspecting whether each subpixel normally emit light.

In another example, after the display device having been rolled out, whether a display panel has a defect may be determined by using characteristic values of subpixels detected during a period of sensing one or more characteristic values.

However, in some cases, such as a case where a sensing line for detecting a characteristic value is not present in a subpixel circuit of a display panel (e.g., a structure of two transistors and one capacitor (2T1C)), or a case where detecting a current flowing through a driving transistor may not be available (e.g., a case where a base voltage is applied to a source electrode of the driving transistor), detecting a current flowing through the display panel in real time may not be available, and thereby, it may be problematic to determine whether the display panel has a defect.

SUMMARY

Accordingly, the present disclosure is directed to a display device, a gate driving circuit, and a display driving method that substantially obviate one or more of problems due to limitations and disadvantages described above.

More specifically, the present disclosure is to provide a display device, a gate driving circuit, and a display driving method that are capable of effectively determining a defect in a display panel.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

One or more embodiments of the present disclosure may provide a display device, a gate driving circuit, and a display driving method that are capable of effectively determining a defect in a display panel by controlling double gate driving circuits to operate in a defect detecting mode during one or more blank periods for sensing characteristic values of subpixels.

One or more embodiments of the present disclosure may provide a display device, a gate driving circuit, and a display driving method that are capable of effectively determining a defect in a display panel, while double gate driving circuits operate in a defect detecting mode, by enabling one gate driving circuit located on one edge of the display panel to perform a sensing data writing operation for sensing characteristic values of subpixels, and the other gate driving circuit located in another edge of the display panel to perform a scan signal receiving operation for receiving a sensing scan signal.

To achieve these and other advantages and in accordance with the present disclosure, as embodied and broadly described, a display device includes a display panel in which a plurality of gate lines are arranged in a first direction, and a plurality of subpixel arrays each including a plurality of subpixels are arranged in the first direction; a gate driving circuit including a first gate driving circuit located in one edge of the display panel and a second gate driving circuit located in another edge of the display panel, the first gate driving circuit and the second gate driving circuit sharing one gate line connected to one subpixel array; and a timing controller for controlling the gate driving circuit to operate in a defect detecting mode to detect a defect in the display panel during one or more blank periods in which the subpixels of the display panel do not emit light.

In another aspect of the present disclosure, a gate driving circuit for driving a display panel in which a plurality of gate lines are arranged in a first direction, and a plurality of subpixel arrays each including a plurality of subpixels are arranged in the first direction may be provided that includes: a first gate driving circuit connected to one gate line connected to one or more subpixels included in one subpixel array and located in one edge of the display panel; and a second gate driving circuit sharing the one gate line with the first gate driving circuit and located in another edge of the display panel, wherein the first and second gate driving circuits operate in a defect detecting mode to detect a defect in the display panel during one or more blank periods in which the subpixels of the display panel do not emit light.

In another aspect of the present disclosure, a method of driving a display panel in which a plurality of gate lines are arranged in a first direction, and a plurality of subpixel arrays each including a plurality of subpixels are arranged in the first direction may be provided that includes: in one or more active periods in which the subpixels of the display panel emit light, controlling a first gate driving circuit located in one edge of the display panel and a second gate driving circuit located in another edge of the display panel to perform an image data driving operation based on a configuration where one gate line connected to one or more subpixels included in one subpixel array is shared by the first and second gate driving circuits; and during one or more blank periods in which the subpixels of the display panel do not emit light, controlling the first and second gate driving circuits operate in a defect detecting mode to detect a defect in the display panel.

According to one or more embodiments of the present disclosure, a display device, a gate driving circuit, and a display driving method may be provided that are capable of effectively determining whether a display panel has a defect.

According to one or more embodiments of the present disclosure, a display device, a gate driving circuit, and a display driving method may be provided that are capable of effectively determining whether a display panel has a defect by designing double gate driving circuits to operate in a defect detecting mode during a sensing period for sensing characteristic values of subpixels.

According to one or more embodiments of the present disclosure, a display device, a gate driving circuit, and a display driving method may be provided that are capable of effectively determining whether a display panel has a defect, when double gate driving circuits operates in a defect detecting mode, by enabling one gate driving circuit located on one side of the display panel to perform a sensing data writing operation for sensing characteristic values of subpixels, and the other gate driving circuit located on another side of the display panel to perform a scan signal receiving operation for receiving a sensing scan signal.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure.

In the drawings.

DETAILED DESCRIPTION

Figure 1:
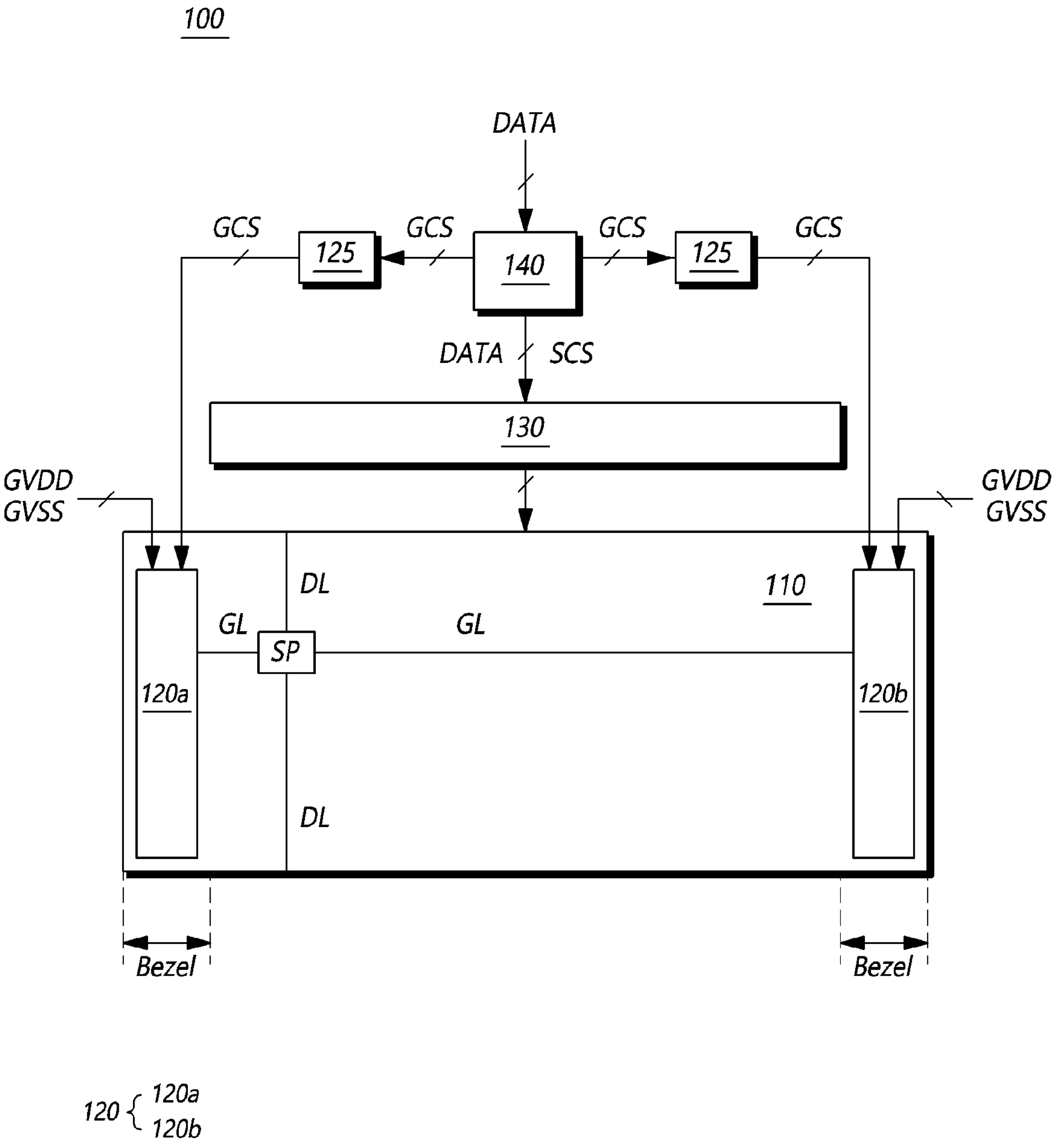
FIG. 1 illustrates an example display device according to aspects of the present disclosure.

Hereinafter, some embodiments of the present disclosure will be described in detail with reference to exemplary drawings. Reference will now be made in detail to embodiments of the present disclosure, examples of which may be illustrated in the accompanying drawings.

In the following description, the structures, embodiments, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted. The shapes, sizes, ratios, angles, numbers, and the like, which are illustrated in the drawings to describe various example embodiments of the present disclosure, are merely given by way of example. Therefore, the present disclosure is not limited to the illustrations in the drawings. Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

When it is mentioned that a first element "is connected or coupled to", "contacts or overlaps" etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap", etc. each other.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

In addition, when any dimensions, relative sizes etc. are mentioned, it should be considered that numerical values for an elements or features, or corresponding information (e. g., level, range, etc.) include a tolerance or error range that may be caused by various factors (e. g., process factors, internal or external impact, noise, etc.) even when a relevant description is not specified. Further, the term "may" fully encompasses all the meanings of the term "may".

Hereinafter, various embodiments of the present disclosure will be described in detail with reference to the accompanying drawings.

FIG. 1 illustrates an example display device according to aspects of the present disclosure;

Referring to FIG. 1, in one or more embodiments, a display device 100 according to aspects of the present disclosure may include a display panel 110, a gate driving circuit 120, a data driving circuit 130, a timing controller 140, and the like.

The display panel 110 may include a plurality of data lines DL and a plurality of gate lines GL, which intersect each other, and subpixels SP, each of which is disposed at each intersecting area, that are arranged in a matrix form to form subpixel arrays.

In an example where the display device 100 is implemented as a liquid crystal display device, the display panel 110 may include a liquid crystal layer disposed between two substrates, and may be configured to operate in any typical operation mode, such as a twisted nematic (TN) mode, a vertical alignment (VA) mode, an in plane switching (IPS) mode, a fringe field switching (FFS) mode, or the like. In another example where the display device 100 is implemented as an organic light emitting display device, the display panel 110 may be configured to have a top emission structure, a bottom emission structure, a dual emission structure, or the like.

Each subpixel SP may include one or more thin film transistors (TFT) disposed in an area defined by one data line DL and one gate line GL, a light emitting element configured to emit light depending on a data voltage, a storage capacitor electrically connected to the light emitting element and configured to maintain a voltage for a predefined time, and the like. The one or more thin film transistors may include a driving transistor and one or more switching transistors. For example, the thin film transistors may be implemented as p-type transistors or n-type transistors. In another example, the thin film transistors may be implemented in a hybrid configuration in which one or more p-type transistors and one or more n-type transistor are mixed.

For example, in an example where the display device 100 has a resolution of 2,160×3,840 and each pixel includes four subpixels SP including a white subpixel W, a red subpixel R, a green subpixel G, and a blue subpixel B, the display device 100 may include a total of 15,360 data lines DL as 3,840 data lines DL are needed to be connected to 2,160 gate lines GL and each of four subpixels SP (i.e., 3,840×4=15,360), and subpixels SP may be respectively disposed in areas defined by the gate lines GL and the data lines DL.

The timing controller 140 may receive image data DATA from an external host system through various interface schemes. The timing controller 140 may correct image data DATA for compensating for a driving variance of a subpixel SP based on a sensing result obtained by sensing one or more characteristic values of the subpixel (e. g., a threshold voltage or mobility of a driving transistor), and transmit the corrected image data DATA to the data driving circuit 130.

The timing controller 140 may receive timing signals such as a vertical sync signal Vsync, a horizontal sync signal Hsync, a data enable signal DE, and the like from the host system. The timing controller 140 may generate a source control signal SCS for controlling an operation timing of the data driving circuit 130 and a gate control signal GCS for controlling an operation timing of the gate driving circuit 120 based on timing signals received from the host system.

For example, the source control signal SCS may include a source sampling clock SSC, a source output enable signal SOE, and the like. The source sampling clock SSC may be a clock for controlling a sampling timing of image data DATA in the data driving circuit 130 based on a rising edge or a falling edge. The source output enable signal SOE may be a signal for controlling an output timing of an analog data voltage applied to the display panel 110.

The timing controller 140 may control display driving operation and sensing driving operation for subpixel arrays included in the display panel 110 based on the source control signal SCS and the gate control signal GCS. Thereby, characteristic values of subpixels SP may be sensed in real time during one or more periods in which one or more images are displayed.

For example, each of the subpixel arrays may include subpixels SP arranged adjacent to each other in one line in the horizontal direction.

The sensing driving operation refers to an operation of applying sensing data to subpixels SP arranged in a specific subpixel array, sensing characteristic values of the subpixels SP, and updating compensation values for compensating for variances in characteristic values of the subpixels SP based on the sensed characteristic values.

To perform the sensing driving operation, the gate driving circuit 120 may perform a sensing data writing (SDW) operation for writing sensing data into subpixels SP included in a specific subpixel array during the sensing driving operation.

The display driving operation refers to a process of writing image data DATA in one frame period received from the host system in subpixel arrays to display the image data DATA on the display panel 110. To perform the display driving operation, the gate driving circuit 120 may perform an image data writing (IDW) operation.

The gate driving circuit 120 may perform the image data writing operation during an active period in one frame period and the sensing data writing operation during a blank period in which image data is not supplied.

The data driving circuit 130 may include a plurality of source driving integrated circuits SDIC. The data driving circuit 130 may receive image data DATA from the timing controller 140. The data driving circuit 130 may generate data voltages by converting the image data DATA into gamma compensation voltages in response to a source control signal SCS from the timing controller 140, synchronize the data voltages with scan signals from the gate driving circuit 120, and then, supply the data voltages to data lines DL of the display panel 110.

The data driving circuit 130 may be connected to data lines DL of the display panel 110 through a chip on glass (COG) process or a tape automated bonding (TAB) process.

The display device 100 may include one or more level shifters 125 for boosting a voltage level of a gate control signal GCS output from the timing controller 140 and suppling a signal resulting from the boosting to the gate driving circuit 120. For example, the one or more level shifters 125 may be located inside of the gate driving circuit 120. In this example, each of the level shifters 125 may be located inside of a respective one of the gate driving circuits 120*a* and 120*b*. In another example, the one or more level shifters 125 may be located on a source printed circuit board on which the data driving circuit 130 is disposed.

The one or more level shifters 125 may boost a transistor-transistor-logic (TTL) voltage level of a gate control signal GCS received from the timing controller 140 to a gate-on voltage and/or a gate-off voltage for switching one or more transistors included in the display panel 110. Thereafter, the one or more level shifter 125 may supply the boosted gate control signal GCS to the gate driving circuit 120.

The gate control signal GCS may include a gate start pulse, a scan clock, a line selection signal, a reset signal, a panel on signal, and the like. For example, the scan clock may be composed of N-phase clocks (where N is a natural number) which have different phases from each other.

For example, in the display device 100 having a resolution of 2,160×3,840, the operation of sequentially outputting scan signals from the first gate line to the 2,160th gate line for 2,160 gate lines GL may be referred to as 2,160-phase driving. In another example, as in the case of sequentially outputting scan signals from the first gate line to the fourth gate line, and then sequentially outputting scan signals from the fifth gate line to the eighth gate line, etc., the operation of sequentially outputting scan signals on the basis of four gate lines GL may be referred to as 4-phase driving. That is, the operation of sequentially outputting scan signals for every N number of gate lines GL may be referred to as N-phase driving.

For example, the gate driving circuit 120 may include one or more gate driving integrated circuits GDIC.

Figure 2:
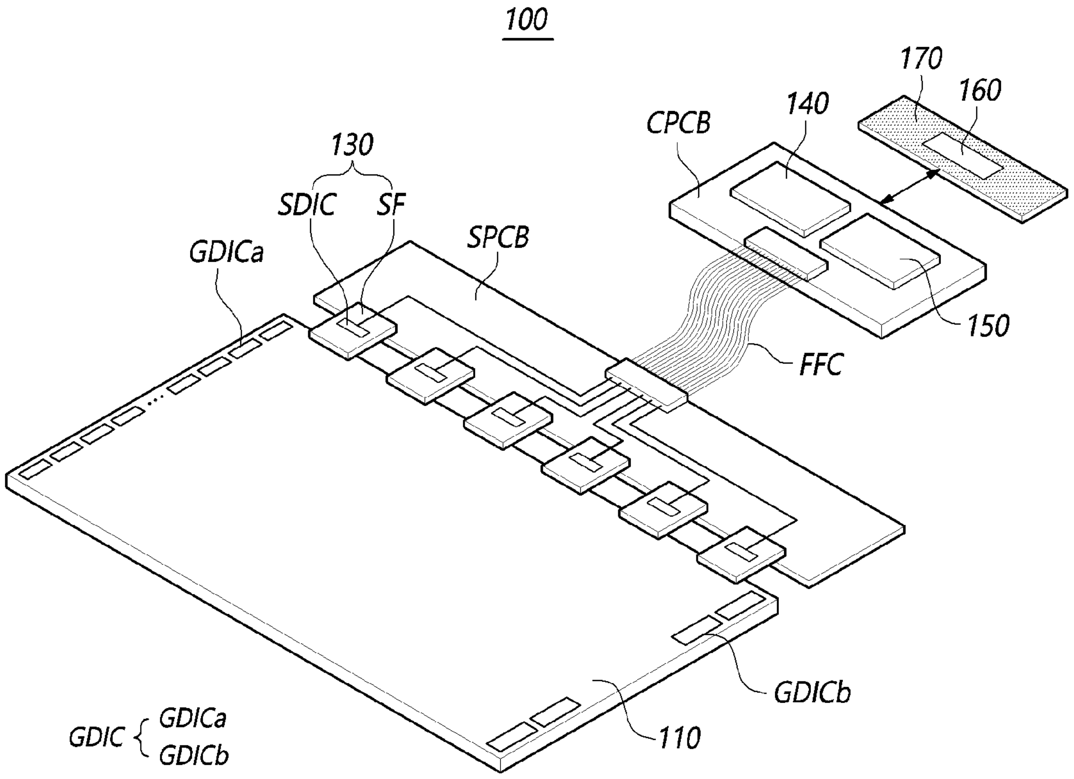
FIG. 2 illustrates an example system of the display device according to aspects of the present disclosure.

The gate driving circuit 120 may perform an image data writing operation of outputting a display scan signal during an active period, and perform a sensing data writing operation of outputting a sensing scan signal for sensing characteristic values of subpixels SP during a blank period, based on a gate control signal GCS received from one or more level shifters 125 and one or more power supply voltages (GVDD and/or GVSS) supplied by a power management circuit (e. g., a power management circuit 150 in FIG. 2).

The gate driving circuit 120 may be directly disposed on a substrate of the display panel 110 using a gate-in-panel (GIP) technique.

The gate driving circuit 120 may be located in a bezel area of the display panel 110 where an image is not displayed, but embodiments of the present disclosure are not limited thereto. The gate driving circuit 120 may be configured to have a double bank structure in which to minimize a distortion of a scan signal due to signal delay, a first gate driving circuit 120*a* is disposed in a first bezel area of the display panel 110, and a second gate driving circuit 120*b* is disposed in a second bezel area of the display panel 110.

In one or more embodiments, the display device 100 may include the power management circuit configured to supply various levels of voltages or currents to the display panel 110, the gate driving circuit 120, the data driving circuit 130, and the like, or configured to control various levels of voltages or currents to be supplied.

The power management circuit may generate power needed for driving the display panel 110, the gate driving circuit 120, and the data driving circuit 130 by adjusting a DC voltage supplied by an external host system.

The display device 100 may include various types of display devices, such as a liquid crystal display device, an organic light emitting display, a plasma display device, a quantum dot display device, and/or the like.

FIG. 2 illustrates an example system of the display device 100 according to aspects of the present disclosure.

Referring to FIG. 2, in one or more embodiments, in the display device 100 according to aspects of the present disclosure, the data driving circuit 130 may be implemented using a chip-on-film (COF) technique and the gate driving circuit 120 may be implemented using the gate-in-panel (GIP) technique, among various techniques such as a tape-automated-bonding (TAB) technique, a chip-on-glass (COG) technique, the COF technique, the GIP technique, and the like.

In an example where the gate driving circuit 120 is implemented using the GIP technique, a plurality of gate driving integrated circuits (GDICa and GDICb) included in the gate driving circuit 120 may be directly disposed in one or more bezel areas of the display panel 110. In this example, the gate driving integrated circuits (GDICa and GDICb) may receive various types of signals (e. g., a clock, a gate high signal, a gate low signal, and the like) needed to generate scan signals through signal lines related to gate driving disposed in the one or more bezel areas.

In a manner similar to the gate driving circuit 120, one or more source driving integrated circuits SDIC included in the data driving circuit 130 may be mounted on one or more respective source films SF, and one side of each source film SF may be electrically connected to the display panel 110. Lines for electrically connecting between the one or more source driving integrated circuits SDIC and the display panel 110 may be respectively disposed in upper portions of the one or more source films SF.

The display device 100 may include at least one source printed circuit board SPCB for circuital connections between the one or more source driving integrated circuits SDIC and other units or devices, and a control printed circuit board CPCB for mounting control components and several types of electrical units or devices.

For example, one side of a source film SF on which a source driving integrated circuit SDIC is mounted may be connected to the at least one source printed circuit board SPCB. That is, one side of the source film SF on which the source driving integrated circuit SDIC is mounted may be electrically connected to the at least one source printed circuit board SPCB, and the other side thereof may be electrically connected to the display panel 110.

The timing controller 140 and the power management circuit 150 may be mounted on the control printed circuit board CPCB. The timing controller 140 may control operations of the data driving circuit 130 and the gate driving circuit 120. The power management circuit 150 may supply various levels of voltages or currents to the display panel 110, the gate driving circuit 120, the data driving circuit 130, and the like, or control various levels of voltages or currents to be supplied.

The at least one source printed circuit board SPCB and the control printed circuit board CPCB may be electrically connected to each other through at least one connector, such as a flexible printed circuit FPC, a flexible flat cable FFC, and/or the like. In one or more embodiments, the at least one source printed circuit board SPCB and the control printed circuit board CPCB may be integrated into one printed circuit board.

The display device 100 may further include a set board 170 electrically connected to the control printed circuit board CPCB. The set board 170 may be referred to as a power board. A main power management circuit 160 configured to manage the entire power of the display device 100 may be mounted on the set board 170. The main power management circuit 160 may interwork with the power management circuit 150.

In the embodiments where the display device 100 includes the power management circuit 150, the set board 170, the control printed circuit board CPCB, and the like as described above, one or more driving voltages generated by the set board 170 may be transmitted to the power management circuit 150 of the control printed circuit board CPCB. The power management circuit 150 may transmit one or more driving voltages needed for display driving or characteristic value sensing to the source printed circuit board SPCB through the flexible printed circuit FPC or the flexible flat cable FFC. One or more driving voltages transmitted to the source printed circuit board SPCB may be supplied to the display panel 110 through one or more source driving integrated circuits SDIC, and used to enable one or more specific subpixels SP to emit light or sense one or more subpixels SP.

In one or more embodiments, each subpixel SP included in the display panel 110 of the display device 100 may include circuit elements, such as a light emitting element (e.g., an organic light emitting diode OLED), a driving transistor for driving the light emitting element, and the like.

Types of the circuit elements and the number of the circuit elements included in each subpixel SP may be different depending on types of the panel (e.g., an LCD panel, an OLED panel, etc.), provided functions, design schemes/features, and/or the like.

Figure 3:
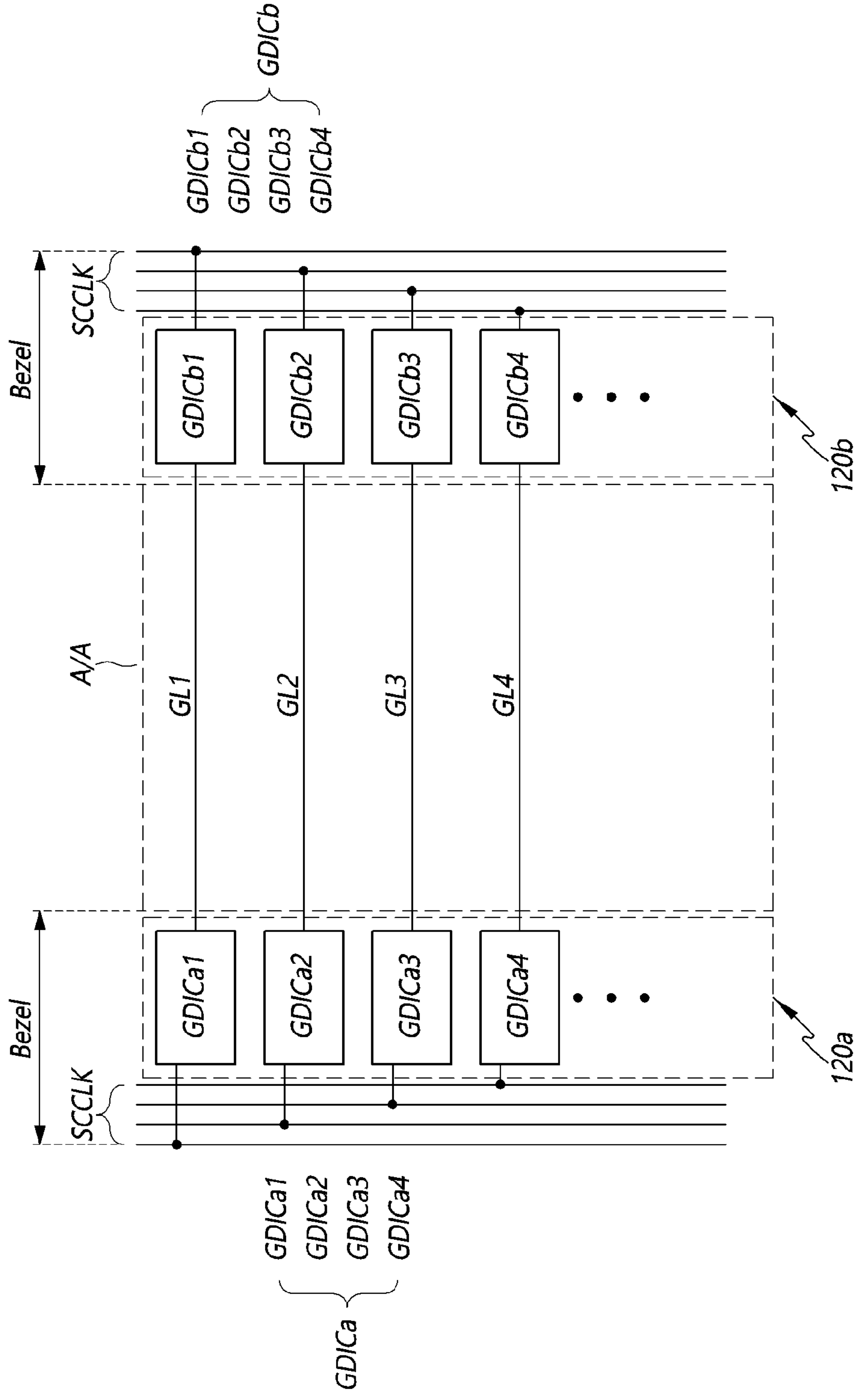
FIG. 3 illustrates an example display panel in which a gate driving circuit is implemented using a GIP technique in the display device according to aspects of the present disclosure.

FIG. 3 illustrates an example configuration of the display panel 110 in which the gate driving circuit 120 is implemented using the GIP technique in the display device 100 according to aspects of the present disclosure.

Referring to FIG. 3, in one or more embodiments, in the display device 100 according to aspects of the present disclosure, n gate lines GL (where n is a natural number) may be disposed in an active area A/A allowing an image to be displayed.

The active area A/A is an area in which a plurality of subpixels SP for emitting respective light of intended colors, for example, white subpixels, red subpixels, green subpixels, and blue subpixels, are arranged, and thereby, one or more images may be displayed. In one or more embodiments, a plurality of dummy subpixels not allowing light to emit because no scan signal or data voltage is applied but having loads similar to those of subpixels SP may be disposed in one or more portions of the active area A/A.

In one or more implementations, an area including the area where a plurality of subpixels allowed to emit light of corresponding colors are disposed and the area where a plurality of dummy subpixels not allowed to emit light are disposed may be referred to as the active area A/A. In one or more implementations, subpixels including both a plurality of subpixels allowed to emit light of corresponding colors and a plurality of dummy subpixels not allowed to emit light may be referred to as a pixel array or pixel arrays.

The gate driving circuit 120 may include gate driving circuits (120*a* and 120*b*) integrated into bezel areas Bezel respectively adjacent to left and right edges of active area A/A, in which subpixels are not disposed, and include n gate driving integrated circuits GDIC corresponding to n gate lines GL.

For example, two first gate driving integrated circuits (GDICa1 and GDICb1) may be provided for supplying a scan signal through a first gate line GL1 and connected to respective ends of the first gate line GL1. More specifically, a left first gate driving integrated circuit GDICa1 may be disposed adjacent to a left edge of the active area A/A and connected to a left end of the first gate line GL1, and a right first gate driving integrated circuit GDICb1 may be disposed adjacent to a right edge of the active area A/A and connected to a right end of the first gate line GL1.

Two second gate driving integrated circuits (GDICa2 and GDICb2) may be provided for supplying a scan signal through a second gate line GL2 and connected to respective ends of the second gate line GL2. More specifically, a left second gate driving integrated circuit GDICa2 may be disposed adjacent to the left edge of the active area A/A and connected to a left end of the second gate line GL2, and a right second gate driving integrated circuit GDICb2 may be disposed adjacent to the right edge of the active area A/A and connected to a right end of the second gate line GL2.

Two third gate driving integrated circuits (GDICa3 and GDICb3) may be provided for supplying a scan signal through a third gate line GL3 and connected to respective ends of the third gate line GL3. More specifically, a left third gate driving integrated circuit GDICa3 may be disposed adjacent to the left edge of the active area A/A and connected to a left end of the third gate line GL3, and a right third gate driving integrated circuit GDICb3 may be disposed adjacent to the right edge of the active area A/A and connected to a right end of the third gate line GL3.

Two fourth gate driving integrated circuits (GDICa4 and GDICb4) may be provided for supplying a scan signal through a fourth gate line GL4 and connected to respective ends of the fourth gate line GL4. More specifically, a left fourth gate driving integrated circuit GDICa4 may be disposed adjacent to the left edge of the active area A/A and connected to a left end of the fourth gate line GL4, and a right fourth gate driving integrated circuit GDICb4 may be disposed adjacent to the right edge of the active area A/A and connected to a right end of the fourth gate line GL4.

In this implementation, the left first gate driving integrated circuit GDICa1 to the left fourth gate driving integrated circuit GDICa4 disposed adjacent to the left edge of the active area A/A may be referred to as a left gate driving integrated circuit GDICa, and the right first gate driving integrated circuit GDICb1 to the right fourth gate driving integrated circuit GDICb4 disposed adjacent to the right edge of the active area A/A may be referred to as a right gate driving integrated circuit GDICb.

Each gate driving integrated circuit GDIC may include a light emitting driving circuit for supplying light emitting signals through gate lines GL, as well as a scan driving circuit for supplying scan signals through gate lines GL.

In this manner, in the example where the gate driving circuit 120 is implemented using the GIP technique, since it is not needed to manufacture a separate integrated circuit having a gate driving function and then bond it to the display panel 110, therefore, the number of integrated circuits may be reduced and a process of connecting the integrated circuit to the display panel 110 may be omitted. Further, the size of a bezel area in the display panel 110 where integrated circuits are bonded may be reduced.

In one or more embodiments, n gate driving integrated circuits GDIC may be disposed adjacent to both edges of the active area A/A, or disposed in one edge of the display panel 110.

In one or more embodiments, a plurality of clock lines for transferring a scan clock SCCLK needed for generating and outputting scan signals to the gate driving circuit 120 may be disposed in a bezel area Bezel adjacent to one edge of the active area A/A, where pixels are not disposed.

Figure 4:
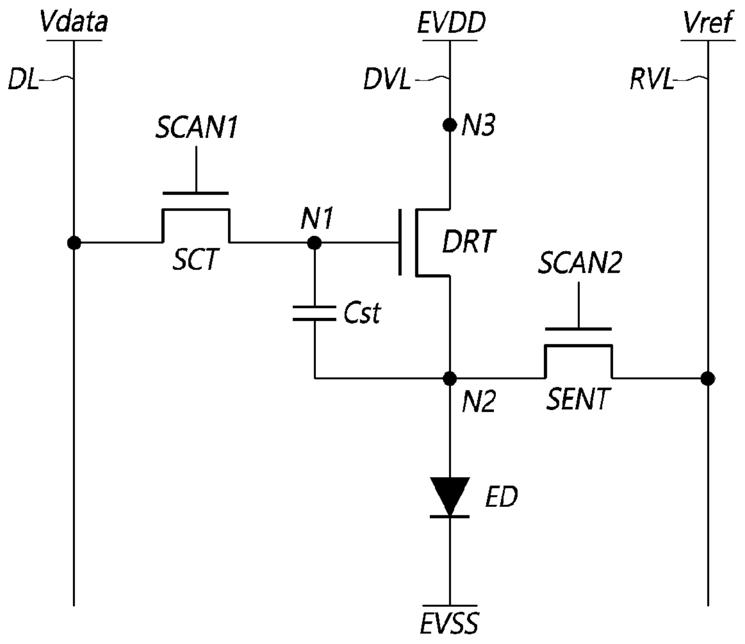
FIG. 4 illustrates an example subpixel circuit included in the display device according to aspects of the present disclosure.

FIG. 4 illustrates an example subpixel circuit included in the display device 100 according to aspects of the present disclosure.

Referring to FIG. 4, in one or more embodiments, the subpixel circuit of the display device 100 according to aspects of the present disclosure may include one or more transistors and one or more capacitors, and a light emitting element.

For example, the subpixel circuit may include a driving transistor DRT, a scan transistor SCT, a sensing transistor SENT, a storage capacitor Cst, and a light emitting element ED.

The driving transistor DRT has a first node N1, a second node N2, and a third node N3. The first node N1 of the driving transistor DRT may be a gate node to which a data voltage Vdata from the data driving circuit 130 through a data line DL is applied when the scan transistor SCT is turned on.

The second node N2 of the driving transistor DRT may be electrically connected to an anode electrode of the light emitting element ED, and may be a source node or a drain node.

The third node N3 of the driving transistor DRT may be electrically connected to a driving voltage line DVL to which a driving voltage EVDD is applied, and be the drain node or the source node.

In this implementation, during a display driving period, a driving voltage EVDD needed to display an image may be supplied through the driving voltage line DVL. For example, the driving voltage EVDD needed to display an image may be 27V.

The scan transistor SCT may be electrically connected between the first node N1 of the driving transistor DRT and the data line DL, and may operate according to a first scan signal SCAN1 supplied through a gate line GL connected to the gate node of scan transistor SCT. When the scan transistor SCT is turned on, the scan transistor SCT may control operation of the driving transistor DRT by allowing a data voltage Vdata provided through the data line DL to be applied to the gate node of the driving transistor DRT.

The sensing transistor SENT may be electrically connected between the second node N2 of the driving transistor DRT and a reference voltage line RVL, and may operate according to a second scan signal SCAN2 supplied through a gate line GL. When the sensing transistor SENT is turned on, a reference voltage Vref supplied through the reference voltage line RVL may be applied to the second node N2 of the driving transistor DRT.

That is, the voltage of the first node N1 and the voltage of the second node N2 of the driving transistor DRT may be controlled by controlling the scan transistor SCT and the sensing transistor SENT, and thereby, a current for driving the light emitting element ED may be supplied to the light emitting element ED.

The gate nodes of the scan transistor SCT and the sensing transistor SENT may be connected to one gate line GL or to different gate lines GL. FIG. 4 illustrates, as an example, a structure in which the scan transistor SCT and the sensing transistor SENT are connected to different gate lines GL. In this example, the scan transistor SCT and the sensing transistor SENT may be independently controlled by the first scan signal SCAN1 and the second scan signal SCAN2 supplied through the different gate lines GL.

In an example where the scan transistor SCT and the sensing transistor SENT are connected to one gate line GL, the scan transistor SCT and the sensing transistor SENT may be controlled concurrently or together by the first scan signal SCAN1 or the second scan signal SCAN2 supplied through the one gate line GL, and thereby, an aperture ratio of the corresponding subpixel SP may be increased.

In one or more embodiments, the transistors disposed in the subpixel circuit may be N-type transistors or P-type transistors, or be configured with at least one N-type transistor and at least one P-type transistor. FIG. 4 illustrates N-type transistors as merely one example.

The storage capacitor Cst may be electrically connected between the first node N1 and the second node N2 of the driving transistor DRT, and may maintain a data voltage Vdata for one frame period.

The storage capacitor Cst may be connected between the first node N1 and the third node N3 of the driving transistor DRT according to a type of the driving transistor DRT. The anode electrode of the light emitting element ED may be electrically connected to the second node N2 of the driving transistor DRT, and a ground voltage EVSS may be applied to the cathode electrode of the light emitting element ED.

For example, the base voltage EVSS may be a ground voltage or a voltage higher or lower than the ground voltage. The base voltage EVSS may be variable according to driving conditions. For example, a base voltage EVSS at a time of display driving and a base voltage EVSS at a time of sensing driving may be set to different values.

The scan transistor SCT and the sensing transistor SENT may be referred to as switching transistors controlled by scan signals (SCAN1 and SCAN2).

In one or more embodiments, to effectively sense one or more characteristic values of the driving transistor DRT, for example, a threshold voltage or mobility, the display device 100 may perform an operation of measuring a current supplied from a voltage charged in the storage capacitor Cst during a period of sensing one or more characteristic values of the driving transistor DR. This operation may be referred to as current sensing.

Thus, by measuring a current supplied from a voltage charged in the storage capacitor Cst during a period of sensing one or more characteristic values of the driving transistor DR, the display device 100 may detect one or more characteristic values of the driving transistor DRT in the corresponding subpixel SP or a variance in the one or more characteristic values.

In this implementation, since the reference voltage line RVL may serve to supply a reference voltage Vref and also serve as a sensing line for sensing one or more characteristic values of the driving transistor DRT of the subpixel SP, the reference voltage line RVL may be referred to as a sensing line or a sensing channel.

As in FIG. 4, the subpixel circuit including three transistors (DRT, SCT, and SENT) and one capacitor Cst may be referred to as a 3T-1C structure. In one or more embodiments, configurations of subpixel circuits may be variously designed. For example, a subpixel circuit including two transistors (DRT, and SCT) and one capacitor (Cst) without a sensing transistor SENT may be referred to as a 2T-1C structure. In one or more embodiments, one or more transistors and one or more capacitors may be further included in the 2T-1C structure or the 3T-1C structure.

In this manner, the display panel 110 may include various structures of subpixel circuits. In the case of determining a defect in the display panel 110 using such subpixel circuits, since different defect detection structures are needed according to respective configurations of subpixel circuits, it may be therefore problematic for the display panel 110 to determine a defect in the display panel 110 in real time in spite of advantages of having various structures of subpixel circuits.

In one or more embodiments, the display device 100 according to aspects of the present disclosure may have a double bank structure in which gate driving circuits are respectively disposed in edges of the display panel 110. In these embodiments, the display device 100 may determine whether the display panel 110 has a defect through a defect detecting mode in which a first gate driving circuit disposed in one edge of the display panel 110 may supply a scan signal SCAN, and a second gate driving circuit disposed in another edge of the display panel 110 may receive the scan signal SCAN.

Figure 5:
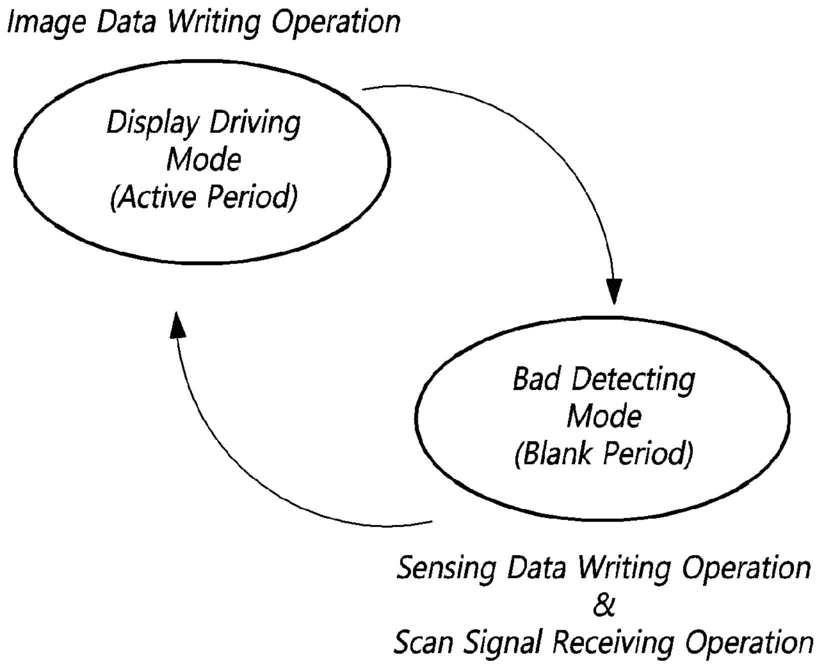
FIG. 5 illustrates example operation modes including a display driving mode and a defect detecting mode, which are switched to each other, in the display device according to aspects of the present disclosure.
Figure 6:
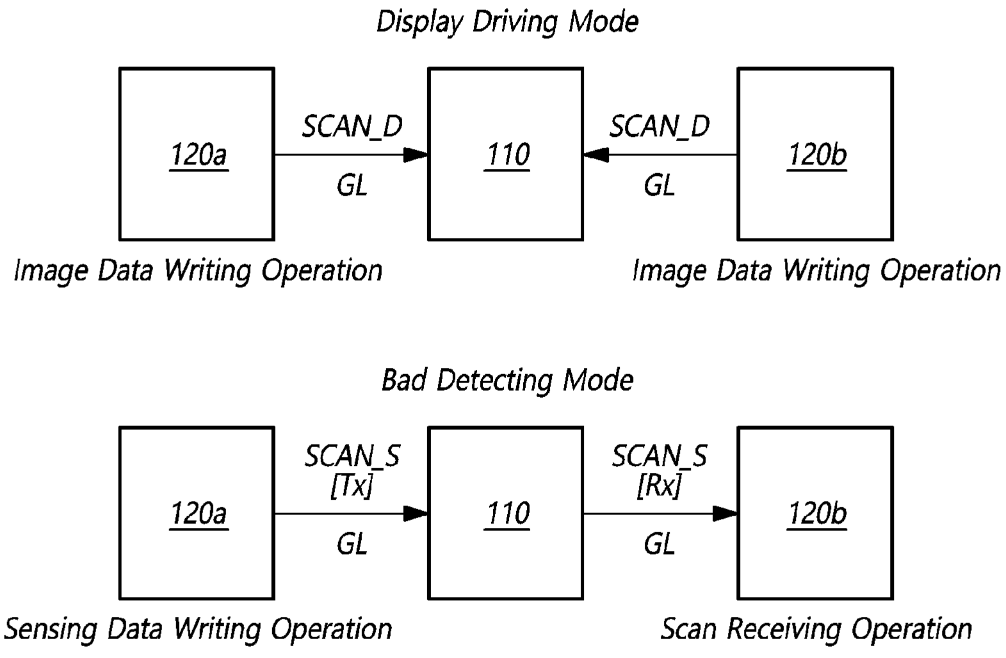
FIG. 6 is an example block diagram for illustrating operation of the gate drive circuit in the display driving mode and the defect detecting mode in the display device according to aspects of the present disclosure.

FIG. 5 illustrates example operation modes including a display driving mode and a defect detecting mode (which may be also referred to as a bad detecting mode), which are switched to each other, in the display device 100 according to aspects of the present disclosure. FIG. 6 is an example block diagram for illustrating operation of the gate drive circuit in the display driving mode and the defect detecting mode in the display device 100 according to aspects of the present disclosure.

Referring to FIGS. 5 and 6, in one or more embodiments, the display device 100 according to aspects of the present disclosure may be configured to operate in one frame including at least one active period in which data voltages within the frame are applied for displaying one or more images on the display panel 110, and at least one blank period in which a data voltage is not applied. Since an operation for sensing one or more characteristic values of a specific subpixel SP may be performed in the blank period, the blank period may be referred to as a sensing period.

During the active period, the first gate driving circuit **120*a* and the second gate driving circuit 120*b* may perform an image data writing operation of supplying display scan signals SCAN_D to the display panel 110 so that data voltages for displaying an image may be applied to subpixels SP. Therefore, in the double bank structure in which the gate driving circuits 120*a* and 120*b* are disposed in respective edges of the display panel 110, during the active period, all the two gate driving circuits 120*a* and 120*b*** may perform the image data writing operation.

In addition, during the blank period, the gate driving circuits **120*a* and 120*b* may operate for detecting a defect in the display panel 110 in the defect detecting mode. In the defect detecting mode, the first gate driving circuit 120*a* located in one edge of the display panel 110 may perform a sensing data writing operation of supplying a sensing scan signal SCAN_S [Tx] for sensing one or more characteristic values of a subpixel SP to the display panel 110, and the second gate driving circuit 120*b* located in another edge of the display panel 110 may perform a scan signal receiving operation of receiving the sensing scan signal SCAN_S [Rx] transmitted through the display panel 110**.

That is, in the defect detecting mode during the blank period, the first gate driving circuit **120*a* may perform the sensing data writing operation, and the second gate driving circuit 120*b*** may perform the scan signal receiving operation.

In this manner, the gate driving circuits **120*a* and 120*b* configured to have the double bank structure employed in the display device 100 may output a display scan signal SCAN_D for displaying an image during the active period in one frame period, and during the blank period, only the first gate driving circuit 120*a* located in one edge of the display panel 110 may output a sensing scan signal SCAN_S [Tx] for sensing one or more characteristic values, whereas the second gate driving circuit 120*b* located in another edge of the display panel 110** may receive a sensing scan signal SCAN_S [Rx].

As a result, the display device 100 may detect a defect in the display panel 110 during the blank period in which the characteristic value of the subpixel SP is sensed.

Figure 7:
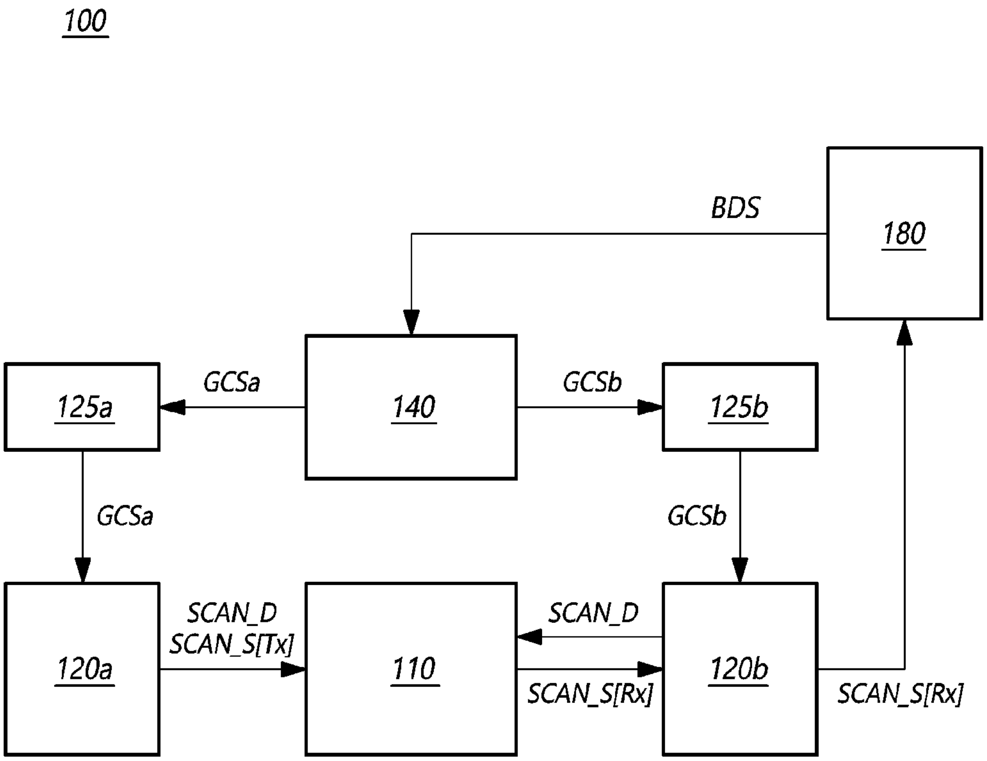
FIG. 7 is an example block diagram for conceptually representing operation of the display device according to aspects of the present disclosure.

FIG. 7 is an example block diagram for conceptually representing the operation of the display device 100 according to aspects of the present disclosure.

Referring to FIG. 7, in one or more embodiments, the display device 100 according to aspects of the present disclosure may include the display panel 110 in which a plurality of subpixels SP are disposed, the plurality of gate driving circuits (e.g., including the first gate driving circuit 120*a* and the second gate driving circuit 120*b* as discussed above) for driving the display panel 110, the plurality of level shifters (e.g., including the first level shifter 125*a* and the second level shifter 125*b* as discussed above) respectively corresponding to the plurality of gate driving circuits (120*a* and 120*b*), the timing controller 140 controlling the plurality of level shifters (125*a* and 125*b*), and a defect detection circuit configured to generate a defect detection signal BDS by using a sensing scan signal SCAN_S received by one (e.g., 120*b*) of the plurality of gate drive circuits (120*a* and 120*b*) during a blank period.

The timing controller 140 may generate a first gate control signal GCSa for controlling the first gate driving circuit 120*a*, and the first level shifter 125*a* may boost a voltage level of the first gate control signal GCSa and supply the boosted first gate control signal GCSa to the first gate driving circuit 120*a*.

Further, the timing controller 140 may generate a second gate control signal GCSb for controlling the second gate driving circuit 120*b*, and the second level shifter 125*b* may boost a voltage level of the second gate control signal GCSb and supply the boosted second gate control signal GCSb to the second gate driving circuit 120*b*.

In the example where the display device 100 has the double bank structure in which the first gate driving circuit 120*a* and the second gate driving circuit 120*b* are disposed in edges of the display panel 110, the first gate driving circuit 120*a* and the second gate driving circuit 120*b* may perform the same image data writing operation during an active period.

Therefore, during the active period, the gate control signals GCSa and GCSb supplied to the first gate driving circuit 120*a* and the second gate driving circuit 120*b* through the level shifters 125*a* and 125*b* may have the same level and phase. As a result, respective display scan signals SCAN_D supplied to the display panel 110 from the first gate driving circuit 120*a* and the second gate driving circuit 120*b* may have the same level and waveform.

During a blank period, while the first gate driving circuit 120*a* may perform a sensing data writing operation of outputting a sensing scan signal SCAN_S [Tx] for sensing one or more characteristic values of a subpixel SP, the second gate driving circuit 120*b* may perform a scan signal receiving operation of receiving a sensing scan signal SCAN_S [Rx] transmitted by the first gate driving circuit 120*a*.

To perform these operations, during the blank period, a first gate control signal GCSa transmitted to the first gate driving circuit 120*a* and a second gate control signal GCSb transmitted to the second gate driving circuit 120*b* may be different from each other. Accordingly, during the blank period, the timing controller 140 may generate the first gate control signal GCSa so that the first gate driving circuit 120*a* may perform the sensing data writing operation, and generate the second gate control signal GCSb so that the second gate driving circuit 120*b* may perform the scan signal receiving operation.

The second gate driving circuit 120*b* may supply the sensing scan signal SCAN_S [Rx] received through the display panel 110 to the defect detection circuit 180 during the blank period.

The defect detection circuit 180 may generate a defect detection signal BDS (which may be referred to as a bad detection signal BDS) by determining that the display panel 110 has a defect when the sensing scan signal SCAN_S [Rx] transmitted from the second gate driving circuit 120*b* is less than a reference value representing a level of a normal scan signal.

The timing controller 140 may control the operation of the display panel 110 or generate a signal indicating a defect based on the defect detection signal BDS generated by the defect detection circuit 180.

Figure 8:
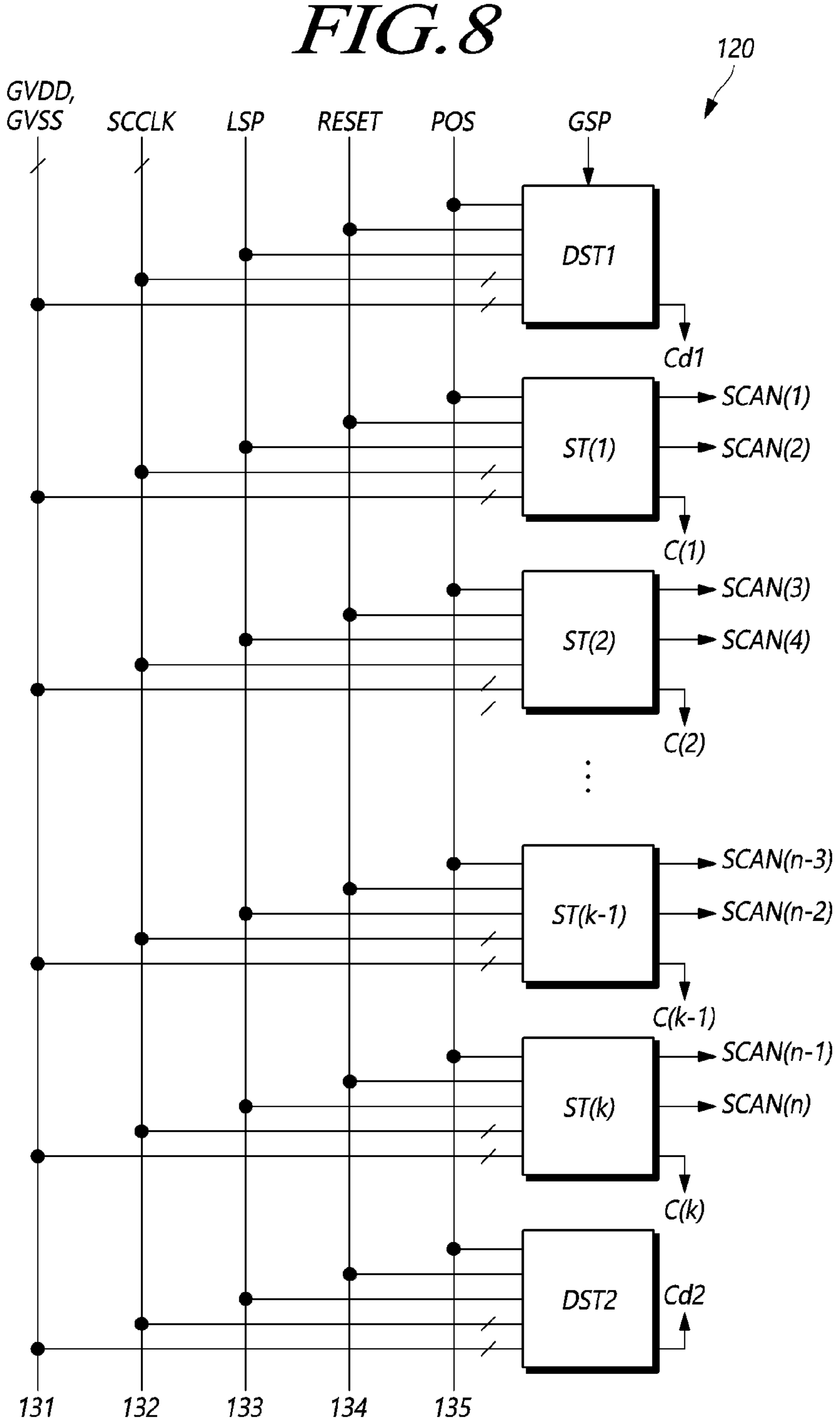
FIG. 8 illustrates an example configuration of stage circuits included in the gate driving circuit according to aspects of the present disclosure.

FIG. 8 illustrates an example configuration of stage circuits included in the gate driving circuit 120 according to aspects of the present disclosure.

Referring to FIG. 8, in one or more embodiments, the gate driving circuit 120 according to aspects of the present specification may include a first stage circuit ST(1) to a kth stage circuit ST(k), a gate driving voltage line 131, a scan clock line 132, a line sensing signal line 133, a reset signal line 134, and a panel-on signal line 135.

In one or more embodiments, the gate driving circuit 120 may further include a preceding dummy stage circuit DST1 disposed prior to the first stage circuit ST(1) and a following dummy stage circuit DST2 disposed following the kth stage circuit ST(k).

The gate driving voltage line 131 may transmit high level gate voltages GVDD and low level gate voltages GVSS supplied by the power management circuit 150 to the first stage circuit ST (1) to the kth stage circuit ST (k), the preceding dummy stage circuit DST1, and the following dummy stage circuit DST2.

In one or more embodiments, the gate driving voltage line 131 may include a plurality of high level gate voltage lines for transmitting a plurality of high level gate voltages GVDD having different voltage levels, and a plurality of low level gate voltage lines for transmitting a plurality of low level gate voltages GVSS having different voltage levels.

For example, the gate driving voltage line 131 may include three high level gate voltage lines for respectively transmitting a first high level gate voltage GVDD1, a second high level gate voltage GVDD2, and a third high level gate voltage GVDD3, which have different voltage levels from each other, and three low level gate voltage lines for respectively transmitting a first low level gate voltage GVSS1, a second low level gate voltage GVSS2, and a third low level gate voltage GVSS3, which have different voltage levels from each other. However, this is only one example, and the number of lines included in the gate driving voltage line 131 may vary according to embodiments.

The scan clock line 132 may supply a plurality of scan clocks SCCLK supplied by the timing controller 140 to the first stage circuit ST (1) to the kth stage circuit ST (k), the preceding dummy stage circuit DST1, and the following dummy stage circuit DST2. The scan clock line 132 may include a carry clock line for delivering a carry clock.

The line sensing signal line 133 may supply a line sensing signal LSP supplied by the timing controller 140 to the first stage circuit ST (1) to the kth stage circuit ST (k). In one or more embodiments, the line sensing signal line 133 may be additionally connected to the preceding dummy stage circuit DST1.

The reset signal line 134 may supply a reset signal RESET supplied by the timing controller 140 to the first stage circuit ST (1) to the kth stage circuit ST (k), the preceding dummy stage circuit DST1, and the following dummy stage circuit DST2.

The panel-on signal line 135 may supply a panel-on signal POS supplied by the timing controller 140 to the first stage circuit ST (1) to the kth stage circuit ST (k), the preceding dummy stage circuit DST1, and the following dummy stage circuit DST2.

In one or more embodiments, one or more lines for supplying other signals, as well as the lines (131, 132, 133, 134, and 135) shown in FIG. 8, may be further connected to the first stage circuit ST(1) to the kth stage circuit ST(k), the preceding dummy stage circuit DST1, and/or the following dummy stage circuit DST2. For example, a line for supplying a gate start pulse GSP may be additionally connected to the preceding dummy stage circuit DST1.

The preceding dummy stage circuit DST1 may output a first dummy carry signal Cd1 in response to the application of the gate start pulse GSP supplied by the timing controller 140.

The first dummy carry signal Cd1 may be supplied to any one of the first stage circuit ST (1) to the kth stage circuit ST (k).

The following dummy stage circuit DST2 may output a second dummy carry signal Cd2. The second dummy carry signal Cd2 may be supplied to any one of the first stage circuit ST (1) to the kth stage circuit ST (k).

The first stage circuit ST(1) to the kth stage circuit ST(k) may be connected to each other in a stepwise or cascaded manner.

Each of the first stage circuit ST (1) to the kth stage circuit ST (k) may output j scan signals SCAN (where j is a positive integer) and one carry signal C. That is, any one of the first stage circuit ST (1) to the kth stage circuit ST (k) may output first to jth scan signals and one carry signal C.

For example, each stage circuit may output two scan signals SCAN and one carry signal C. For example, the first stage circuit ST(1) may output the first scan signal SCAN (1), the second scan signal SCAN(2), and a first carry signal C(1), and the second stage circuit ST(2) may output the third scan signal SCAN(3), the fourth scan signal SCAN(4), and a second carry signal C(2). In this example, j is 2.

The number of scan signals output by the first stage circuit ST(1) to the kth stage circuit ST(k) may be matched to the number of gate lines GL disposed in the display panel 110.

For example, when j=2, the number k of stage circuits becomes ½ of the number of gate lines GL. However, the number of scan signals output by each stage circuit according to embodiments of the present disclosure is not limited thereto. In one or more embodiments, each stage circuit may output 1, 3, or 4 scan signals, or may output 5 or more scan signals. The number of stage circuits may vary depending on the number of scan signals output by each stage circuit.

Scan signals SCAN output by the first stage circuit ST(1) to the kth stage circuit ST(k) may be scan signals for driving one or more driving transistors DRT, or scan signals for sensing characteristic values of one or more driving transistors DRT. Carry signals C output by the first stage circuit ST(1) to the kth stage circuit ST(k) may be supplied to different stage circuits.

Herein, a carry signal received by any stage circuit from a preceding stage circuit may be referred to as a preceding stage carry signal, and a carry signal received by any stage circuit from a following stage circuit may be referred to as a following stage carry signal.

Figure 9:
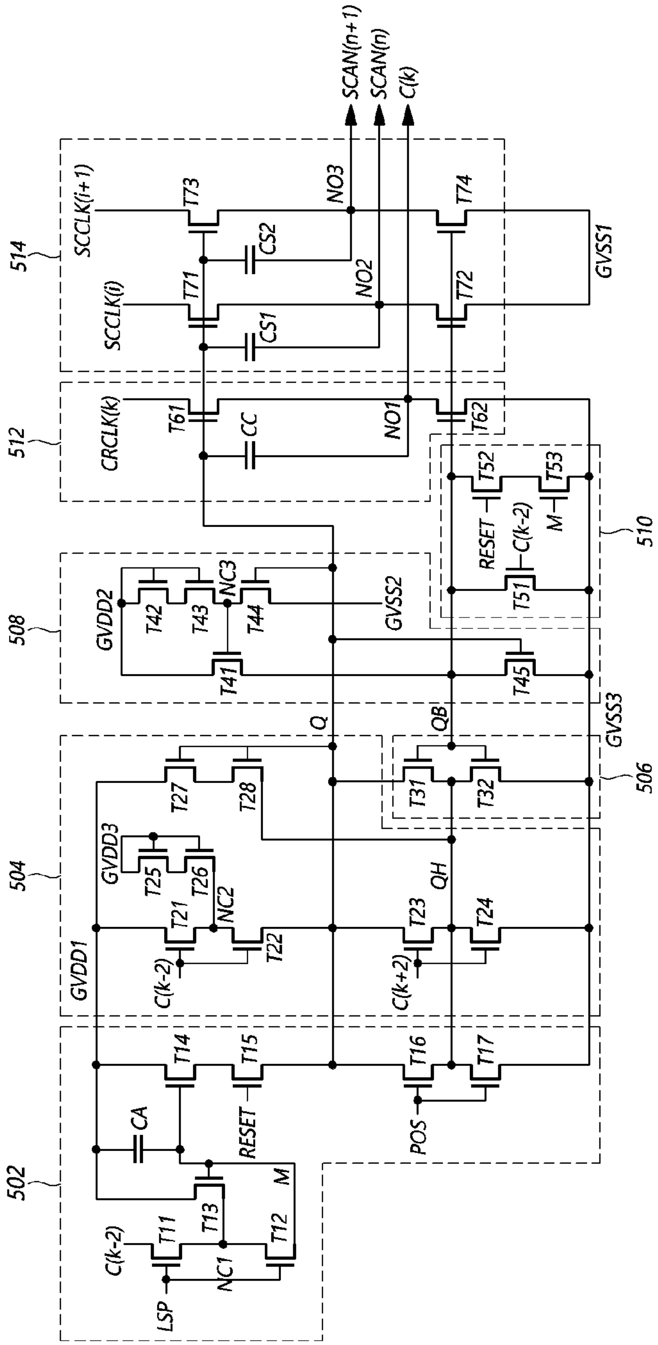
FIG. 9 illustrates an example stage circuit included in the gate driving circuit in a display driving circuit of the display device according to aspects of the present disclosure.

FIG. 9 illustrates an example stage circuit included in the gate driving circuit in a display driving circuit of the display device 100 according to aspects of the present disclosure.

Referring to FIG. 9, in one or more embodiments, a stage circuit of the gate driving circuit 120 according to aspects of the present disclosure may include an M node, a Q node, and a QB node, and include a line selector 502, a Q node controller 504, a Q node stabilizer 506, an inverter 508, a QB node stabilizer 510, a carry signal generator 512, and a scan signal generator 514.

The line selector 502 may charge the M node based on a preceding stage carry signal C (k−2) in response to the application of a line sensing signal LSP. The line selector 502 may charge the Q node to the level of a first high level gate voltage GVDD1 based on a charging voltage of the M node in response to the application of a reset signal RESET. The line selector 502 may discharge or reset the Q node to the level of a third low level gate voltage GVSS3 in response to the application of a panel-on signal POS.

The line selector 502 may include first to seventh transistors (T11 to T17) and a precharging capacitor CA.

The first transistor T11 and the second transistor T12 may be connected between a first high level gate voltage line for transmitting the first high level gate voltage GVDD1 and the M node. The first transistor T11 and the second transistor T12 may be connected in series with each other.

The first transistor T11 may output the preceding stage carry signal C (k−2) to a first connection node NC1 in response to the application of the line sensing signal LSP.

The second transistor T12 may electrically connect the first connection node NC1 to the M node in response to the application of the line sensing signal LSP. For example, when the line sensing signal LSP with a high level of voltage is applied to the first transistor T11 and the second transistor T12, the first transistor T11 and the second transistor T12 may be concurrently turned on, this enabling the M node to charge with the level of the first high level gate voltage GVDD1.

The third transistor T13 may be turned on when a voltage level of the M node reaches a high level, and supply the first high level gate voltage GVDD1 to the first connection node NC1. When the first high level gate voltage GVDD1 is supplied to the first connection node NC1, a voltage difference between a gate voltage of the first transistor T11 and the first connection node NC1 may increase.

Therefore, when the line sensing signal LSP with a low level is applied to the gate node of the first transistor T11, and the first transistor T11 is turned off, the first transistor T11 may be maintained in a completely turned-off state due to the voltage difference between the gate voltage of the first transistor T11 and the first connection node NC1. Thus, current leakage of the first transistor T11 and voltage drop of the M node caused by the current leakage of the first transistor T11 may be prevented, this enabling the voltage of the M node to be stably maintained.

The precharging capacitor CA may be connected between the first high level gate voltage line for transmitting the first high level gate voltage GVDD1 and the M node, and may store a voltage difference between the first high level gate voltage GVDD1 and a voltage charged in the M node.

When the first transistor T11, the second transistor T12, and the third transistor T13 are turned on, the precharging capacitor CA may store a high voltage of the preceding stage carry signal C (k−2). When the first transistor T11, the second transistor T12, and the third transistor T13 are turned off, the precharging capacitor CA may maintain the voltage of the M node with the stored voltage for a predetermined time.

The fourth transistor T14 and the fifth transistor T15 may be connected between the first high level gate voltage line for transmitting the first high level gate voltage GVDD1 and the Q node. The fourth transistor T14 and the fifth transistor T15 may be connected in series with each other.

The fourth transistor T14 and the fifth transistor T15 may charge the Q node to the first high level gate voltage GVDD1 in response to the voltage of the M node and the application of the reset signal RESET.

The fourth transistor T14 may be turned on when the voltage of the M node reaches the high level and transfer the first high level gate voltage GVDD1 to a node shared by the fourth transistor T14 and the fifth transistor T15.

The fifth transistor T15 may be turned on by the reset signal RESET with a high level and supply the voltage of the shared node to the Q node. Accordingly, when the fourth transistor T14 and the fifth transistor T15 are concurrently turned on, the Q node may be charged with the first high level gate voltage GVDD1.

The sixth transistor T16 and the seventh transistor T17 may be connected between a third low level gate voltage line for transmitting the third low level gate voltage GVSS3 and the Q node. The sixth transistor T16 and the seventh transistor T17 may be connected in series with each other.

The sixth transistor T16 and the seventh transistor T17 may discharge the Q node to the third low level gate voltage GVSS3 in response to the application of the panel-on signal POS. The discharging of the Q node to the third low level gate voltage GVSS3 may also be referred to as the resetting of the Q node.

The seventh transistor T17 may be turned on by the application of the panel-on signal POS with a high level and supply the third low level gate voltage GVSS3 to the QH node.

The sixth transistor T16 may be turned on by the application of the panel-on signal POS with the high level and electrically interconnect the Q node and the QH node. Accordingly, when the sixth transistor T16 and the seventh transistor T17 are concurrently turned on, the Q node may be discharged or reset to the third low level gate voltage GVSS3.

The Q node controller 504 may charge the Q node to the level of the first high level gate voltage GVDD1 in response to the application of the preceding stage carry signal C (k−2), and discharge the Q node to the level of the third low level gate voltage GVSS3 in response to the application of a following stage carry signal C (k+2).

The Q node controller 504 may include first to eighth transistors T21 to T28.

The first transistor T21 and the second transistor T22 may be connected between the first high level gate voltage line for transmitting the first high level gate voltage GVDD1 and the Q node. The first transistor T21 and the second transistor T22 may be connected in series with each other.

The first transistor T21 and the second transistor T22 may charge the Q node to the level of the first high level gate voltage GVDD1 in response to the application of the preceding stage carry signal C (k−2).

The first transistor T21 may be turned on by the application of the preceding stage carry signal C (k−2), and supply the first high level gate voltage GVDD1 to a second connection node NC2.

The second transistor T22 may be turned on by the application of the preceding stage carry signal C (k−2) and electrically interconnect the second connection node NC2 and the Q node. Accordingly, when the first transistor T21 and the second transistor T22 are concurrently turned on, the first high level gate voltage GVDD1 may be supplied to the Q node.

The fifth transistor T25 and the sixth transistor T26 may be connected to a third high level gate voltage line for transmitting the third high level gate voltage GVDD3. The fifth transistor T25 and the sixth transistor T26 may supply the third high level gate voltage GVDD3 to the second connection node NC2 in response to the application of the third high level gate voltage GVDD3.

The fifth transistor T25 and the sixth transistor T26 may be concurrently turned on by the third high level gate voltage GVDD3 and constantly supply the third high level gate voltage GVDD3 to the second connection node NC2. Thereby, a voltage difference between the gate node of the first transistor T21 and the second connection node NC2 may increase. Therefore, when the preceding stage carry signal C (k−2) with a low level is applied to the gate node of the first transistor T21, and the first transistor T21 is turned off, the first transistor T21 may be maintained in a completely turned-off state due to the voltage difference between the gate voltage of the first transistor T21 and the second connection node NC2.

Thus, current leakage of the first transistor T21 and voltage drop of the Q node caused by the current leakage of the first transistor T11 may be prevented, this enabling the voltage of the Q node to be stably maintained.

For example, when a threshold voltage of the first transistor T21 is negative polarity (−), a gate-source voltage Vgs of the first transistor T21 may be maintained as negative polarity (−) by the third high level gate voltage GVDD3 supplied to the drain electrode thereof.

Thus, when the preceding stage carry signal C (k−2) with the low level is applied to the gate node of the first transistor T21, and the first transistor T21 is turned off, the first transistor T21 may completely remain in the turned-off state and the occurrence of corresponding leakage current may be prevented.

In one or more embodiments, the third high level gate voltage GVDD3 may be set to a voltage level lower than the first high level gate voltage GVDD1.

The third transistor T23 and the fourth transistor T24 may be connected between the third low level gate voltage line for transmitting the third low level gate voltage GVSS3 and the Q node. The third transistor T23 and the fourth transistor T24 may be connected in series with each other.

The third transistor T23 and the fourth transistor T24 may discharge the Q node and the QH node to the level of the third low level gate voltage GVSS3 in response to the application of the following stage carry signal C (k+2).

The fourth transistor T24 may be turned on by the application of the following stage carry signal C (k+2) and discharge the QH node to the level of the third low level gate voltage GVSS3. The third transistor T23 may be turned on by the application of the following stage carry signal C (k+2) and electrically interconnect the Q node and the QH node. Accordingly, when the third transistor T23 and the fourth transistor T24 are concurrently turned on, the Q node and the QH node may be discharged or reset to the level of the third low level gate voltage GVSS3.

The seventh transistor T27 and the eighth transistor T28 may connected between the first high level gate voltage line for transmitting the first high level gate voltage GVDD1 and the Q node, and between the first high level gate voltage line for transmitting the first high level gate voltage GVDD1 and the QH node. The seventh transistor T27 and the eighth transistor T28 may be connected in series with each other.

The seventh transistor T27 and the eighth transistor T28 may supply the first high level gate voltage GVDD1 to the QH node in response to the voltage of the Q node. The seventh transistor T27 may be turned on when the voltage of the Q node reaches a high level and transfer the first high level gate voltage GVDD1 to a node shared by the seventh transistor T27 and the eighth transistor T28.

The eighth transistor T28 may be turned on when the voltage of the Q node reaches the high level and electrically connect the shared node and the QH node. The seventh transistor T27 and the eighth transistor T28 may be concurrently turned on when the voltage of the Q node reaches the high level and supply the first high level gate voltage GVDD1 to the QH node.

When the first high level gate voltage GVDD1 is supplied to the QH node, a voltage difference between the gate node of the third transistor T23 and the QH node may increase. Therefore, when the following stage carry signal C (k+2) with a low level is applied to the gate node of the third transistor T23, and the third transistor T23 is turned off, the third transistor T23 may be maintained in a completely turned-off state due to the voltage difference between the gate voltage of the third transistor T23 and the QH node. Thus, current leakage of the third transistor T23 and voltage drop of the Q node caused by the current leakage of the third transistor T23 may be prevented, this enabling the voltage of the Q node to be stably maintained.

The Q node stabilizer 506 may discharge the Q node and the QH node to the level of the third low level gate voltage GVSS3 in response to the voltage of the QB node. The Q node stabilizer 506 may include a first transistor T31 and a second transistor T32. The first transistor T31 and the second transistor T32 may be connected between the third low level gate voltage line for transmitting the third low level gate voltage GVSS3 and the Q node. The first transistor T31 and the second transistor T32 may be connected in series with each other.

The first transistor T31 and the second transistor T32 may discharge the Q node and the QH node to the level of the third low level gate voltage GVSS3 in response to the voltage of the QB node. The second transistor T32 may be turned on when the voltage of the QB node reaches a high level, and supply the third low level gate voltage GVSS3 to a node shared by the first and second transistors T31 and T32.

The first transistor T31 may be turned on when the voltage of the QB node reaches the high level and electrically interconnect the Q node and the QH node. Accordingly, when the first transistor T31 and the second transistor T32 are concurrently turned on in response to the voltage of the QB node, the Q node and the QH node may be discharged or reset to the level of the third low level gate voltage GVSS3.

The inverter 508 may change a voltage level of the QB node according to a voltage level of the Q node. The inverter 508 may include first to fifth transistors T41 to T45.

The second transistor T42 and the third transistor T43 may be connected between a second high level gate voltage line for transmitting the second high level gate voltage GVDD2 and a third connection node NC3. The second transistor T42 and the third transistor T43 may be connected in series with each other.

The second transistor T42 and the third transistor T43 may supply the second high level gate voltage GVDD2 to the third connection node NC3 in response to the second high level gate voltage GVDD2. The second transistor T42 may be turned on by the second high level gate voltage GVDD2, and transfer the second high level gate voltage GVDD2 to a node shared by the second transistor T42 and the third transistor T43.

The third transistor T43 may be turned on by the second high level gate voltage GVDD2, and electrically interconnect the shared node of the second transistor T42 and the third transistor T43 and the third connection node NC3. Accordingly, when the second transistor T42 and the third transistor T43 are concurrently turned on by the second high level gate voltage GVDD2, the third connection node NC3 may be charged with the level of the second high level gate voltage GVDD2.

The fourth transistor T44 may be connected between the third connection node NC3 and a second low level gate voltage line for transmitting the second low level gate voltage GVSS2.

The fourth transistor T44 may supply the second low level gate voltage GVSS2 to the third connection node NC3 in response to the voltage of the Q node. The fourth transistor T44 may be turned on when the voltage of the Q node reaches the high level, and discharge or reset the third connection node NC3 to the second low level gate voltage GVSS2.

The first transistor T41 may be connected between the second high level gate voltage line for transmitting the second high level gate voltage GVDD2 and the QB node.

The first transistor T41 may supply the second high level gate voltage GVDD2 to the QB node in response to the voltage of the third connection node NC3. The first transistor T41 may be turned on when the voltage of the third connection node NC3 reaches a high level, and charge the QB node to the level of the second high level gate voltage GVDD2.

The fifth transistor T45 may be connected between the QB node and the third low level gate voltage line for transmitting the third low level gate voltage GVSS3.

The fifth transistor T45 may supply the third low level gate voltage GVSS3 to the QB node in response to the voltage of the Q node. The fifth transistor T45 may be turned on when the voltage of the Q node reaches the high level, and discharge or reset the QB node to the level of the third low level gate voltage GVSS3.

The QB node stabilizer 510 may discharge the QB node to the third low level gate voltage GVSS3 in response to the application of the preceding stage carry signal C (k−2), the application of the reset signal, and the charging voltage of the M node. The QB node stabilizer 510 may include first to third transistors T51 to T53.

The first transistor T51 may be connected between the QB node and the third low level gate voltage line for transmitting the third low level gate voltage GVSS3.

The first transistor T51 may supply the third low level gate voltage GVSS3 to the QB node in response to the application of the preceding stage carry signal C (k−2).

The second transistor T52 and the third transistor T53 may be connected between the third low level gate voltage line for transmitting the third low level gate voltage GVSS3 and the QB node. The second transistor T52 and the third transistor T53 may be connected in series with each other.

The second transistor T52 and the third transistor T53 may discharge the QB node to the level of the third low level gate voltage GVSS3 in response to the application of the reset signal RESET and the charging voltage of the M node.

The third transistor T53 may be turned on when the voltage of the M node reaches the high level, and supply the third low level gate voltage GVSS3 to a node shared by the second and third transistors T52 and T53.

The second transistor T52 may be turned on by the application of the reset signal RESET, and electrically interconnect the shared node of the second transistor T52 and the third transistor T53 and the QB node. Accordingly, when the reset signal RESET is applied in a state where the voltage of the M node has the high level, the second transistor T52 and the third transistor T53 may be concurrently turned on, this enabling the QB node to discharge or reset to the level of the third low level gate voltage GVSS3.

The carry signal generator 512 may output a carry signal C (k) based on a voltage level of a carry clock CRCLK (k) according to the voltage level of the Q node or the level of the third low level gate voltage GVSS3 according to the voltage level of the QB node.

The carry signal generator 512 may include a first transistor T61, a second transistor T62, and a boosting capacitor CC.

The first transistor T61 may be connected between a scan clock line for delivering the carry clock CRCLK(k) and a first output node NO1. The boosting capacitor CC may be connected between gate and source nodes of the first transistor T61.

The first transistor T61 may output the carry signal C (k) with a high level through the first output node NO1 based on the carry clock CRCLK (k) in response to the voltage of the Q node. The first transistor T61 may be turned on when the voltage of the Q node reaches the high level, and supply the carry clock CRCLK (k) with the high voltage to the first output node NO1. Accordingly, the carry signal C (k) with the high voltage may be output.

When the carry signal C (k) is output, the boosting capacitor CC may bootstrap or boost the voltage of the Q node until the voltage of the Q node reaches a boosting voltage level higher than the level of the first high level gate voltage GVDD1 in sync with the carry clock CRCLK (k) with the high level. When the voltage of the Q node is bootstrapped or boosted, the carry clock CRCLK (k) with the high level may be output as the carry signal C (k) quickly and without distortion.

The second transistor T62 may be connected between the first output node NO1 and the third low level gate voltage line for transmitting the third low level gate voltage GVSS3.

The second transistor T62 may output the carry signal C (k) with a low level through the first output node NO1 based on the third low level gate voltage GVSS3 in response to the voltage of the QB node. The second transistor T62 may be turned on when the voltage of the QB node reaches the high level, and supply the third low level gate voltage GVSS3 to the first output node NO1. Accordingly, the carry signal C (k) with the low level may be output.

The scan signal generator 514 may output a plurality of scan signals (SCAN (n) and SCAN (n+1)) based on a voltage level of a plurality of scan clocks (SCCLK (n) and SCCLK (n+1)) according to the voltage level of the Q node or the level of the first low level gate voltage GVSS1 according to the voltage level of the QB node.

The scan signal generator 514 may include first to fourth transistors (T71 to T74) and boosting capacitors (CS1 and CS2).

The first transistor T71 and the third transistor T73 may be respectively connected between a scan clock line for delivering a scan clock (SCCLK (n)) and a second output node NO2, and between a scan clock line for delivering a scan clock SCCLK (n+1)) and a third output nodes NO3.

A first boosting capacitor CS1 and a second boosting capacitor CS2 may be respectively connected between respective gate nodes and respective source nodes of the first transistor T71 and the third transistor T73.

The first transistor T71 and the third transistor T73 may respectively output an nth scan signal SCAN (n) with a high level and an (n+1)th scan signal SCAN (n+1) with a high level through the second output node NO2 and the third output node NO3 based on an nth scan clock SCCLK (n) and an (n+1)th scan clock SCCLK (n+1) in response to the voltage of the Q node.

The first transistor T71 and the third transistor T73 may be turned on when the voltage of the Q node reaches the high level, and transfer the scan signals (SCAN (n) and SCAN (n+1)) with the high level to the second and third output nodes (NO2 and NO3). Accordingly, the scan signals (SCAN (n) and SCAN (n+1)) with the high level may be output.

Each of the first transistor T71 and the third transistor T73 may serve as a respective pull-up transistor.

When the nth scan signal SCAN (n) and the (n+1) th scan signal SCAN (n+1) are output, the first boosting capacitor CS1 and the second boosting capacitor CS2 may bootstrap or boost the voltage of the Q node to a boosting voltage level higher than the level of the first high level gate voltage GVDD1 in sync with the scan clocks (SCCLK (n) and SCCLK (n+1)) with the high level. When the voltage of the Q node is bootstrapped or boosted, the scan clocks (SCCLK (n) and SCCLK (n+1)) with the high level may be output as scan signals (SCAN (n) and SCAN (n+1)) quickly and without distortion.

The second transistor T72 and the fourth transistor T74 may respectively output scan signals (SCAN (n) and SCAN (n+1)) with a low level through the second output node NO2 and the third output node NO3 based on the first low level gate voltage GVSS1 in response to the voltage of the QB node.

The second transistor T72 and the fourth transistor T74 may be turned on when the voltage of the QB node reaches the high level, and transfer the first low level gate voltage GVSS1 to the second output node NO2 and the third output node NO3, respectively. Accordingly, the scan signals (SCAN (n) and SCAN (n+1)) with the low level may be output.

Each of second transistor T72 and the fourth transistor T74 may serve as a respective pull-down transistor.

FIG. 9 illustrates an example where three high level gate voltages (GVDD1, GVDD2, and GVDD3) having different levels and three low level gate voltages (GVSS1, GVSS2, and GVSS3) having different levels are supplied to each stage circuit. For example, the first high level gate voltage GVDD1, the second high level gate voltage GVDD2, and the third high level gate voltage GVDD3 may be set to 20 V, 16 V, and 14 V, respectively, and the first low level gate voltage GVSS1, the second low level gate voltage GVSS2, and the third low level gate voltage GVSS3 may be set to −6 V, −10 V, and −12 V, respectively. However, these figures are merely examples, and the levels of the high voltages and the low voltages may be set differently depending on embodiments.

Since the display device 100 according to aspects of the present disclosure operates in the display driving mode during an active period, the stage circuits ST (k) included in the gate driving circuit 120 may perform an image data writing operation during the active period. In addition, since the display device 100 operates in a defect detecting mode for detecting a defect in the display panel 110 during a blank period, the gate driving circuit 120*a* located in one edge of the display panel 110 may perform a sensing data writing operation and the gate driving circuit 120*b* in another edge of the display panel 110 may perform a scan signal receiving operation, during the blank period.

Figure 10:
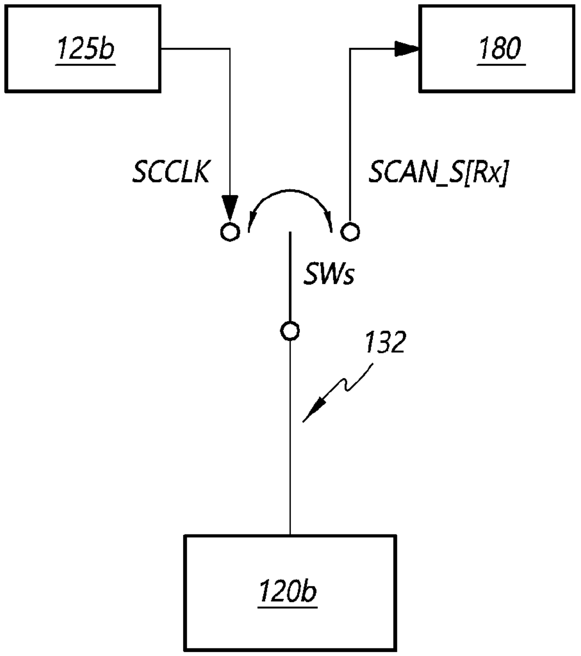
FIG. 10 conceptually illustrates an example structure in which the gate driving circuit operates in a defect detecting mode during a blank period in the display device according to aspects of the present disclosure.

FIG. 10 conceptually illustrates an example structure in which the gate driving circuit operates in a defect detecting mode during a blank period in the display device 100 according to aspects of the present disclosure.

Referring to FIG. 10, in one or more embodiments, the display device 100 according to aspects of the present disclosure may include a defect detecting mode for detecting a defect in the display panel 110 during a blank period.

During a blank period operating in the defect detecting mode, a first gate driving circuit 120*a* (e. g., the first gate driving circuit 120*a* in the figures discussed above) disposed in one edge of the display panel 110 may perform a sensing data writing operation, and a second gate driving circuit 120*b* (e. g., the second gate driving circuit 120*b* in the figures discussed above) disposed in another edge of the display panel 110 may perform a scan signal receiving operation.

The first gate driving circuit 120*a* configured to perform the sensing data writing operation may be located in, for example, but not limited to, a left edge of the display panel 110, and the second gate driving circuit 120*b* configured to perform the scan signal receiving operation may be located in, for example, but not limited to, a right edge of the display panel 110.

The first gate driving circuit 120*a* may perform the sensing data writing operation by receiving a scan clock SCCLK for sensing characteristic values of one or more subpixels SP through a level shifter 125*a* (e. g., the level shifter 125*a* in the figures discussed above) during a blank period. For example, the first gate driving circuit 120*a* may output a sensing scan signal SCAN_S [Tx] for sensing one or more characteristic values by receiving a scan clock SCCLK according to a predetermined timing during a blank period.

The second gate driving circuit 120*b* may perform the scan signal receiving operation during the blank period as the scan clock SCCLK from a level shifter 125*b* (e. g., the level shifter 125*b* in the figures discussed above) is not supplied to the second gate driving circuit 120*b*. For example, since the scan clock SCCLK is not applied to the second gate driving circuit 120*b* during the blank period, the second gate driving circuit 120*b* does not output the sensing scan signal SCAN_S [Tx]. On the other hand, the second gate driving circuit 120*b* may receive the sensing scan signal SCAN_S [Rx] transmitted by the first gate driving circuit 120*a* through an output node.

The sensing scan signal SCAN_S [Tx] transmitted by the first gate driving circuit 120*a* may be received through the output node of the second gate driving circuit 120*b*, and transferred to a defect detection circuit 180 (e. g., the defect detection circuit 180 in the figures discussed above) through a scan clock line 132.

In order for the second gate driving circuit 120*b* to normally receive the sensing scan signal SCAN_S[Tx] transmitted by the first gate driving circuit 120*a*, the output node of the second gate driving circuit 120*b* is needed to maintain an electrical connection with a gate line of the gate driving circuit 120*a*. To meet this requirement, it is desired that a Q node (e.g., the Q node in the figures discussed above) maintains a high level while the second gate driving circuit 120*b* performs the scan signal receiving operation. Further, it is needed that the scan clock line 132 of the second gate driving circuit 120*b* maintains an electrical connection with the defect detection circuit 180 during a blank period.

To address these issues, one or more selection switches SWs for controlling a connection between the level shifter 125*b* and the defect detection circuit 180 may be connected to the scan clock line 132 of the second gate driving circuit 120*b*.

Although FIG. 10 illustrates the example where the selection switch SWs is connected to the second gate driving circuit 120*b*, in one or more embodiments, selection switches SWs may be also connected to the first gate driving circuit 120*a*, as well as the second gate driving circuit 120*b*.

That is, in one aspect, the first gate driving circuit 120*a* may perform the sensing data writing operation and the second gate driving circuit 120*b* may perform the scan signal receiving operation, and in another aspect, the second gate driving circuit 120*b* may perform the sensing data writing operation, and the first gate driving circuit 120*a* may perform the scan signal receiving operation.

In these embodiments, mode selection switches SWs may be located in both the first gate driving circuit 120*a* and the second gate driving circuit 120*b*.

Figure 11:
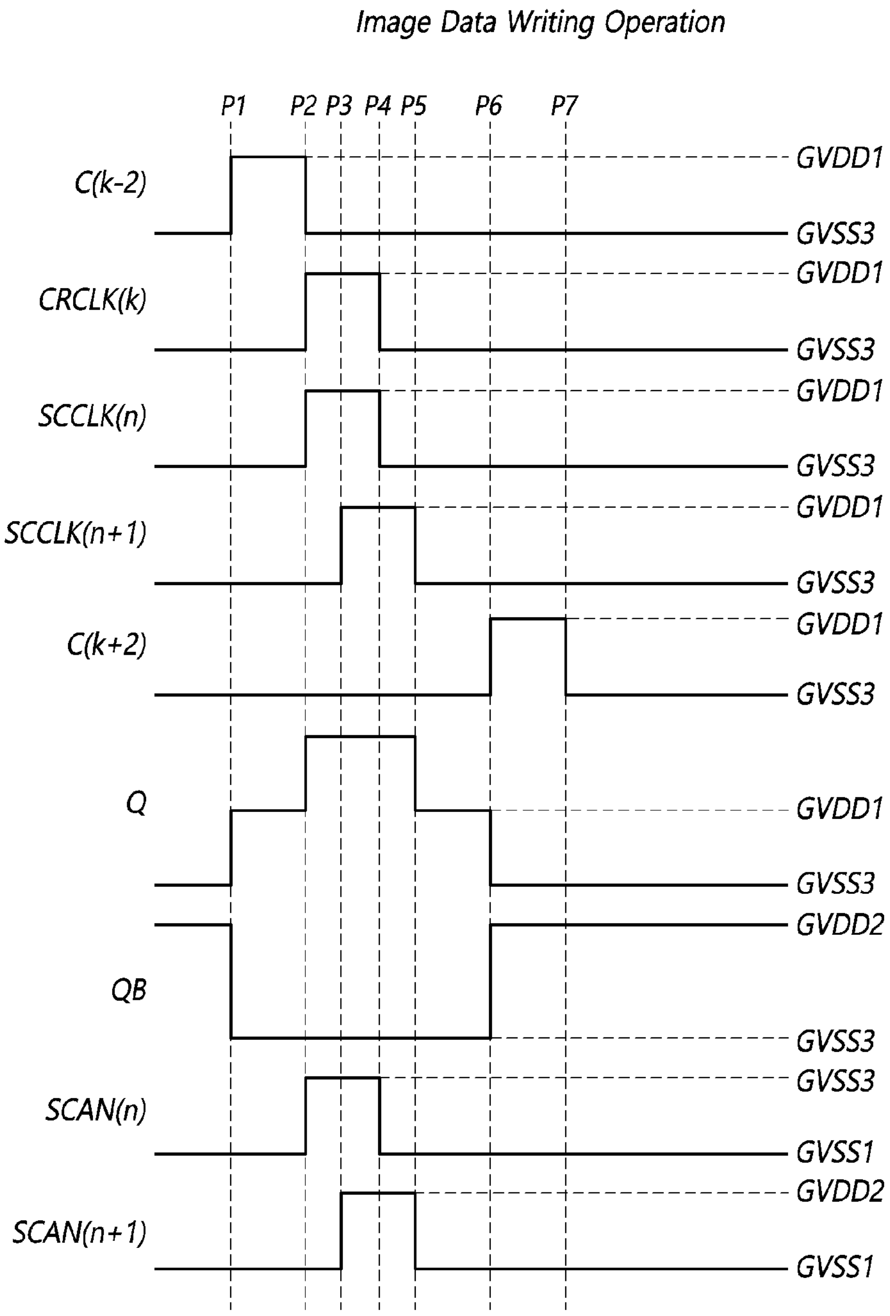
FIG. 11 illustrates an example signal diagram related to an image data writing operation performed by a stage circuit included in the gate driving circuit in the display device according to aspects of the present disclosure.

FIG. 11 illustrates an example signal diagram related to an image data writing operation performed by a stage circuit included in the gate driving circuit 120 in the display device 100 according to aspects of the present disclosure.

Referring to FIGS. 9 and 11, in a first period (P1-P2), when a preceding stage carry signal C (k−2) with a high level is input, the first transistor T21 and the second transistor T22 of the Q node controller 504 may be turned on. Accordingly, the Q node may be charged to the level of a first high level gate voltage GVDD1. As the first transistor T51 of the QB node stabilizer 510 is turned on by the preceding stage carry signal C (k−2) with the high level, the QB node may be discharged to the level of a third low level gate voltage GVSS3.

When a scan clock SCCLK (n) with a high level along with a carry clock CRCLK (k) with a high level is applied in a second period (P2-P3), the voltage of the Q node may be bootstrapped or boosted to a boosting voltage level higher than the level of the first high level gate voltage GVDD1 by the boosting capacitor CS1. Accordingly, a scan signal SCAN (n) for displaying an image of an nth scan line may be output in the second period (P2-P3).

When a scan clock (SCCLK (n+1)) with a high level is applied in a third period (P3-P4) partially overlapping the second period (P2-P3), the voltage of the Q node may be bootstrapped or boosted to the boosting voltage level higher than the level of the first high level gate voltage GVDD1 by the boosting capacitor CS2. Accordingly, a scan signal (SCAN (n+1)) for displaying an image of an (n+1) th scan line may be output in the third period (P3-P4).

In a fifth period (P5-P6), since a scan clock SCCLK is not applied, the voltage of the Q node may be charged to the level of the first high level gate voltage GVDD1 again.

During the period (P1-P6) in which the Q node is charged to the level of the first high level gate voltage GVDD1 or the boosting voltage level, the voltage of the QB node may be maintained at the level of the third low level gate voltage GVSS3.

In a sixth period (P6-P7), when a following carry signal C (k+2) with a high level is applied, the third transistor T23 and the fourth transistor T24 of the Q node controller 504 may be turned on. Accordingly, the Q node may be discharged to the level of the third low level gate voltage GVSS3.

When the Q node is discharged to the third low level gate voltage GVSS3, as the fourth transistor T44 included in the inverter 508 is turned off, and a second high level gate voltage GVDD2 is applied to the gate node of the first transistor T41, the first transistor T41 may be turned on.

When the first transistor T41 is turned on, the QB node may be charged to the level of the second high level gate voltage GVDD2.

Figure 12:
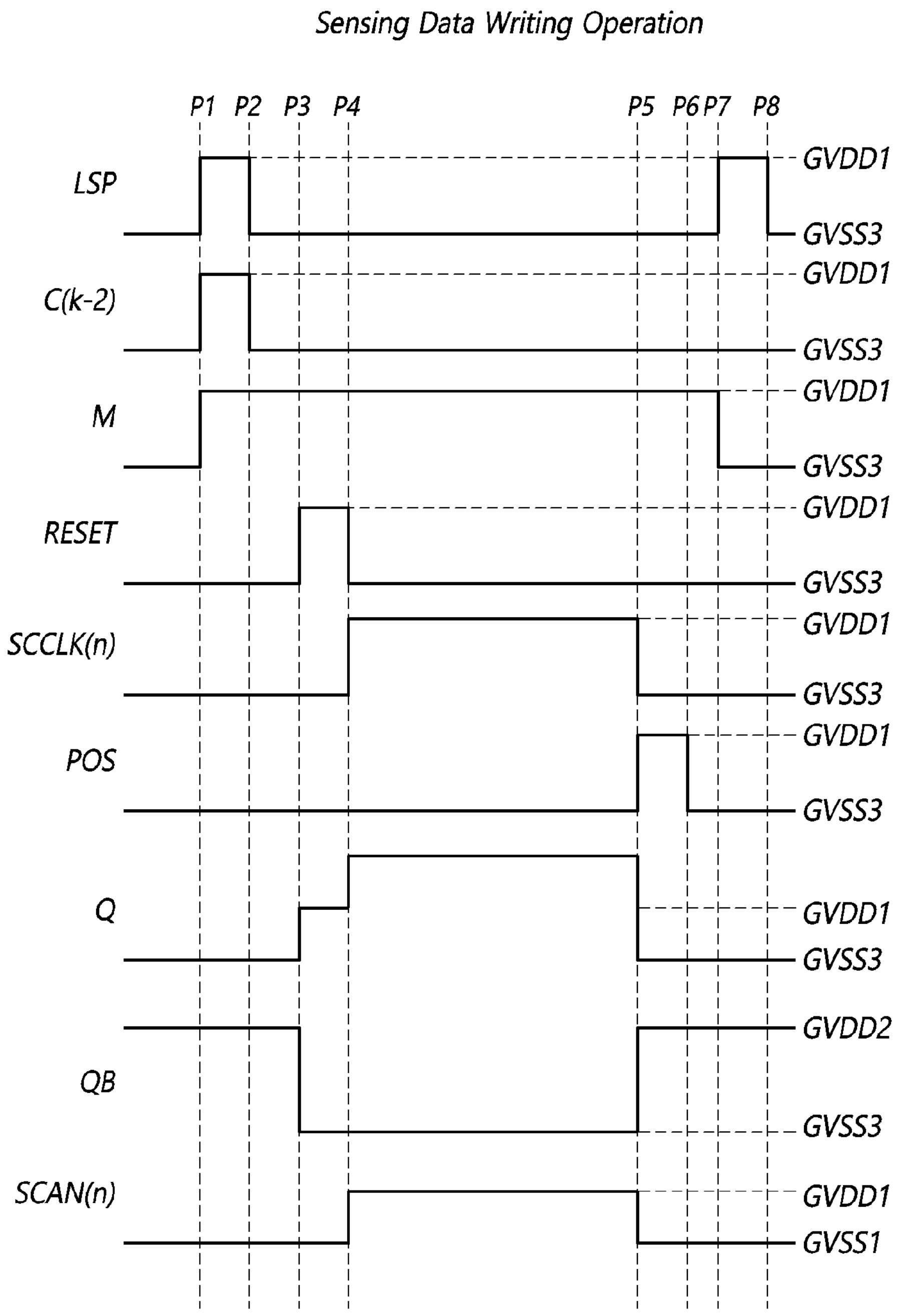
FIG. 12 illustrates an example signal diagram related to a sensing data writing operation performed during a blank period by a stage circuit included in the gate driving circuit in the display device according to aspects of the present disclosure.

FIG. 12 illustrates an example signal diagram related to a sensing data writing operation performed during a blank period by a stage circuit included in the gate driving circuit 120 in the display device 100 according to aspects of the present disclosure.

Referring to FIGS. 9 and 12, in the display device 100 according to aspects of the present disclosure, when a gate line (e. g., an nth gate line) in which a sensing operation is to be performed is selected by the timing controller 140, a line sensing signal LSP with a high level may be applied to a stage circuit corresponding to the selected gate line.

When a preceding stage carry signal C (k−2) along with the line sensing signal LSP with the high level is applied in a first period (P1-P2), the first transistor T11 and the second transistor T12 included in the line selector 502 may be turned on, this enabling the M node to be charged with a voltage level of the preceding stage carry signal C (k−2).

When the line sensing signal LSP with a low level is applied in a second period (P2-P3), the first transistor T11 and the second transistor T12 may be turned off, but the voltage of the M node remains at a high level by a voltage stored in the precharging capacitor CA.

When a reset signal RESET is applied in a third period (P3-P4), the fourth transistor T14 and the fifth transistor T15 included in the line selector 502 may be turned on by the reset signal RESET and the charging voltage of the M node, this enabling the Q node to be charged with the level of the first high level gate voltage GVDD1. Further, when the reset signal RESET is applied in the third period (P3-P4), the second transistor T52 and the third transistor T53 included in the QB node stabilizer 510 may be turned on by the reset signal RESET and the charging voltage of the M node, this enabling the QB node to discharge to the level of the third low level gate voltage GVSS3.

When a scan clock SCCLK (n) with a high level is applied in a fourth period (P4-P5), a voltage of the Q node may be bootstrapped or boosted to a boosting voltage level higher than the level of the first high level gate voltage GVDD1 by the boosting capacitor CS1. Accordingly, a scan signal SCAN (n) for scan operation of an nth gate line may be output in the fourth period (P4-P5).

When a panel-on signal POS is applied in a fifth period (P5-P6), the sixth transistor T16 and the seventh transistor T17 included in the line selector 502 may be turned on, this enabling the Q node to discharge to the level of the third low level gate voltage GVSS3. When the Q node is discharged to the third low level gate voltage GVSS3, as the fourth transistor T44 included in the inverter 508 is turned off, and the second high level gate voltage GVDD2 is applied to the gate node of the first transistor T41, the first transistor T41 may be turned on. When the first transistor T41 is turned on, the QB node may be charged to the level of the second high level gate voltage GVDD2.

Thereafter, as the line sensing signal LSP with the high level is applied in a seventh period (P7-P8), the stage circuit may be initialized.

Figure 13:
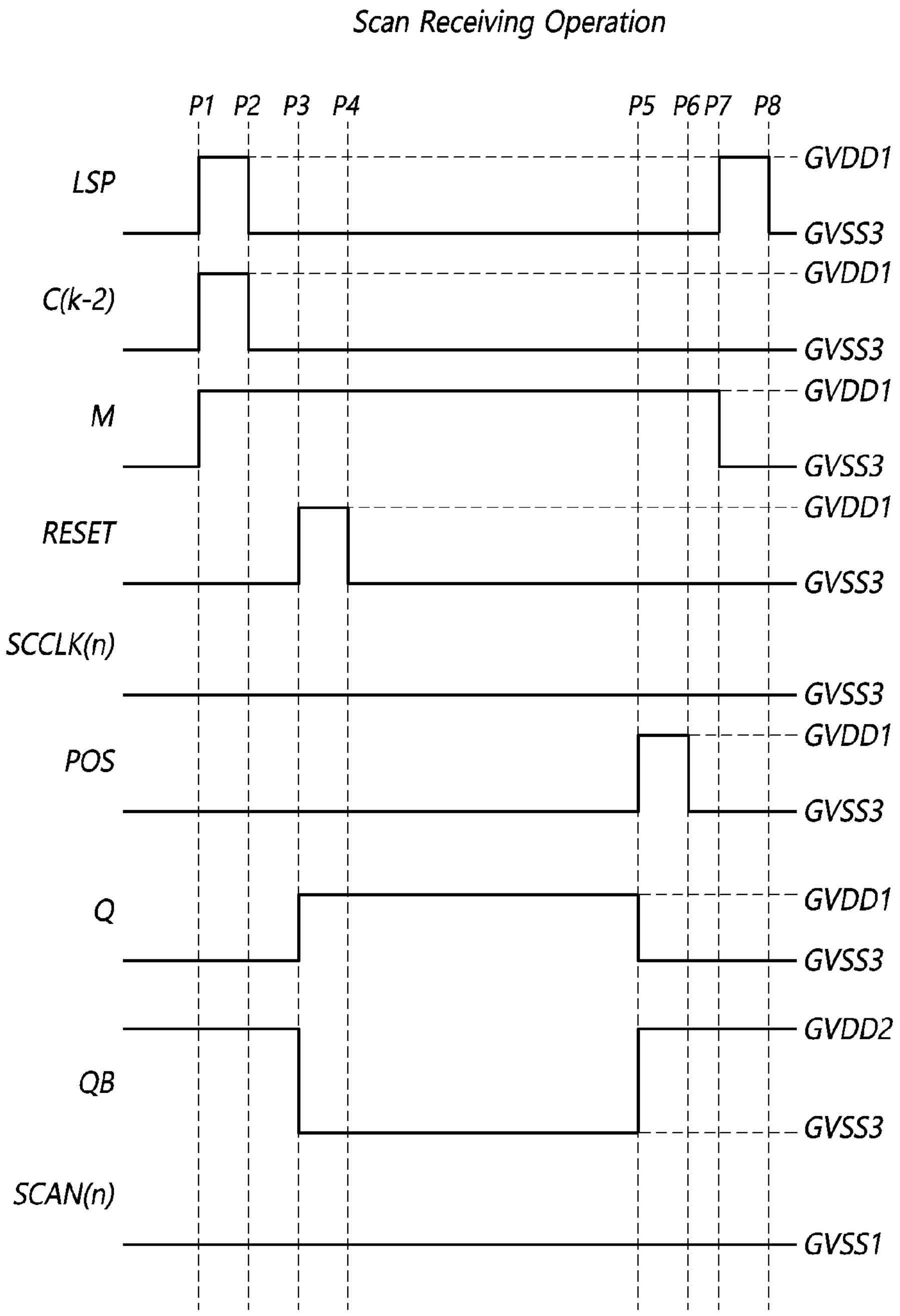
FIG. 13 illustrates an example signal diagram related to a scan signal receiving operation performed during a blank period by a stage circuit included in the gate driving circuit in the display device according to aspects of the present disclosure.

FIG. 13 illustrates an example signal diagram related to a scan signal receiving operation performed during a blank period by a stage circuit included in the gate driving circuit 120 in the display device 100 according to aspects of the present disclosure.

Referring to FIGS. 9 and 13, in the display device 100 according to aspects of the present disclosure, when a gate line (e. g., an nth gate line) in which a sensing operation is to be performed is selected by the timing controller 140, a line sensing signal LSP with a high level may be applied to a stage circuit corresponding to the selected gate line.

When a preceding stage carry signal C (k−2) along with the line sensing signal LSP with the high level is applied in a first period (P1-P2), the first transistor T11 and the second transistor T12 included in the line selector 502 may be turned on, this enabling the M node to be charged with a voltage level of the preceding stage carry signal C (k−2).

When the line sensing signal LSP with a low level is applied in a second period (P2-P3), the first transistor T11 and the second transistor T12 may be turned off, but the voltage of the M node remains at a high level by a voltage stored in the precharging capacitor CA.

When the reset signal RESET is applied in the third period (P3-P4), the fourth transistor T14 and the fifth transistor T15 included in the line selector 502 may be turned on by the reset signal RESET and the charging voltage of the M node, this enabling the QB node to be charged to the level of the first high level gate voltage GVDD1. Further, when the reset signal RESET is applied in the third period (P3-P4), the second transistor T52 and the third transistor T53 included in the QB node stabilizer 510 may be turned on by the reset signal RESET and the charging voltage of the M node, this enabling the QB node to discharge to the level of the third low level gate voltage GVSS3.

In a fourth period (P4-P5), a connection with the level shifter 125 is switched off by a selection switch SWs, and therefore, a scan clock SCCLK (n) cannot be applied. Accordingly, the voltage of the Q node may be maintained at the level of the first high level gate voltage GVDD1, and a scan signal SCAN (n) with a high level cannot be output.

When a panel-on signal POS is applied in a fifth period (P5-P6), the sixth transistor T16 and the seventh transistor T17 included in the line selector 502 may be turned on, this enabling the Q node to discharge to the level of the third low level gate voltage GVSS3. When the Q node is discharged to the third low level gate voltage GVSS3, as the fourth transistor T44 included in the inverter 508 is turned off, and the second high level gate voltage GVDD2 is applied to the gate node of the first transistor T41, the first transistor T41 may be turned on. When the first transistor T41 is turned on, the QB node may be charged to the level of the second high level gate voltage GVDD2.

Thereafter, as the line sensing signal LSP with the high level is applied in a seventh period (P7-P8), the stage circuit may be initialized.

Therefore, since the scan clock SCCLK is not applied to the second gate driving circuit 120*b* performing the scan signal receiving operation during a blank period, the second gate driving circuit 120*b* cannot output a sensing scan signal SCAN_S, and receive the sensing scan signal SCAN_S transmitted by the first gate driving circuit 120*a* through an output node.

Figure 14:
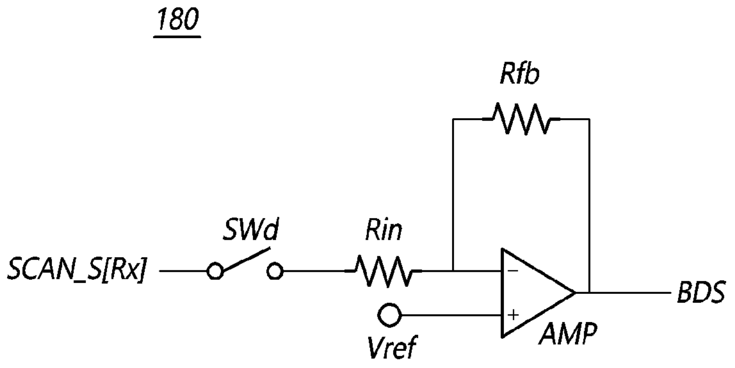
FIG. 14 illustrates an example defect detection circuit included in the display device according to aspects of the present disclosure.

FIG. 14 illustrates an example defect detection circuit included in the display device 100 according to aspects of the present disclosure.

Referring to FIG. 14, in one or more embodiments, the defect detection circuit 180 of the display device 100 according to aspects of the present disclosure may include a detection switch SWd for determining a detection time of a sensing scan signal SCAN_S[Rx], an amplifier AMP including a non-inverting input terminal to which a reference voltage Vref is applied, an inverting input terminal, and an output terminal, an input resistor Rin connected to the inverting input terminal of the amplifier AMP, and a feedback resistor Rfb connected between the inverting input terminal and the output terminal of the amplifier AMP.

The detection switch SWd may determine a comparison time between the received sensing scan signal SCAN_S [Rx] and the reference voltage Vref.

When the detection switch SWd is turned on, the amplifier AMP may compare the sensing scan signal SCAN_S [Rx] with the reference voltage Vref, and output a defect detection signal BDS.

For example, when a level of the sensing scan signal SCAN_S [Rx] transmitted through the second gate driving circuit 120*b* is higher than the reference voltage Vref, it is determined that the sensing scan signal SCAN_S [Tx] is normally transmitted, and thus, the amplifier AMP may output a defect detection signal BDS with a low level.

When the level of the sensing scan signal SCAN_S [Rx] transmitted through the second gate driving circuit 120*b* is lower than the reference voltage Vref, it is determined that a defect has occurred in the display panel 110, and thus, the amplifier AMP may output a defect detection signal BDS with a high level.

Meanwhile, since it takes a certain amount of time until the sensing scan signal SCAN_S[Tx] transmitted by the first gate driving circuit 120*a* reaches the second gate driving circuit 120*b* through the display panel 110, the sensing scan signal SCAN_S[Rx] detected at an output node of the second gate driving circuit 120*b* may be distorted due to time delay.

Figure 15:
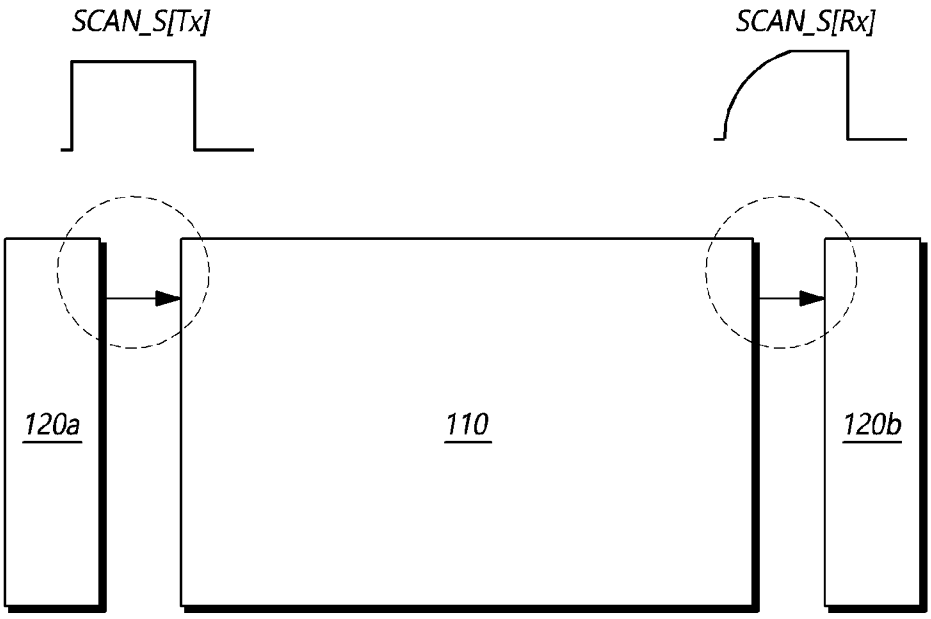
FIG. 15 illustrates example waveforms of a sensing scan signal output by a first gate driving circuit and a sensing scan signal received by a second gate driving circuit in the display device according to aspects of the present disclosure.
Figure 16:
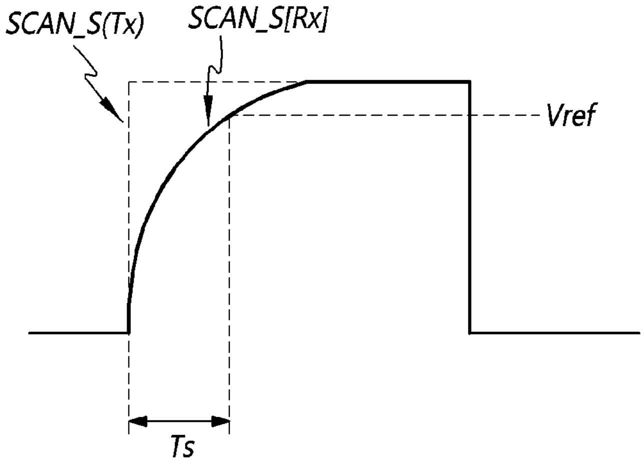
FIG. 16 illustrates example waveforms of explaining an example time delay between a sensing scan signal output by the first gate driving circuit and a sensing scan signal received by the second gate driving circuit in the display device according to aspects of the present disclosure.

FIG. 15 illustrates example waveforms of a sensing scan signal output by the first gate driving circuit 120*a* and a sensing scan signal received by the second gate driving circuit 120*b* in the display device 100 according to aspects of the present disclosure. FIG. 16 illustrates example waveforms of explaining an example time delay between a sensing scan signal output by the first gate driving circuit 120*a* and a sensing scan signal received by the second gate driving circuit 120*b* in the display device 100 according to aspects of the present disclosure.

Referring to FIGS. 15 and 16, in one or more embodiments, during a blank period in which the display device 100 operates in a defect detecting mode, a first gate driving circuit 120*a* (e. g., the first gate driving circuit 120*a* in the figured discussed above) located in a left edge of the display panel 110 may perform a sensing data writing operation, and a second gate driving circuit 120*b* (e. g., the second gate driving circuit 120*b* in the figured discussed above) located in a right edge of the display panel 110 may perform a scan signal receiving operation.

The first gate driving circuit 120*a* may supply a sensing scan signal SCAN_S [Tx] for sensing one or more characteristic values of a subpixel SP to the display panel 110, and the second gate driving circuit 120*b* may receive the sensing scan signal (SCAN_S [Rx]) transferred through the display panel 110.

Meanwhile, since it takes a certain amount of time until the sensing scan signal SCAN_S[Tx] transmitted by the first gate driving circuit 120*a* reaches the second gate driving circuit 120*b* through the display panel 110, the sensing scan signal SCAN_S[Rx] detected at an output node of the second gate driving circuit 120*b* may be distorted due to time delay.

As a result, the sensing scan signal SCAN_S[Rx] received through the output node of the second gate driving circuit 120*b* in the blank period may represent a different waveform from that of the sensing scan signal SCAN_S[Tx] generated at an output node of the first gate driving circuit 120*a*.

In this implementation, since the defect detection circuit 180 compares the reference voltage Vref based on a level of the sensing scan signal SCAN_S[Tx] generated at the output node of the first gate driving circuit 120*a*, it is needed for the defect detection circuit 180 to determine a time for comparing the received sensing scan signal SCAN_S[Rx] with the reference voltage Vref by considering a time delay of the sensing scan signal SCAN_S[Tx] generated by the first gate driving circuit 120*a*.

That is, considering a time delay of the sensing scan signal SCAN_S[Rx] received at the output node of the second gate driving circuit 120*b*, it may be preferable for the defect detection circuit 180 to compare the sensing scan signal SCAN_S[Rx] and the reference voltage Vref after a settling time Ts at which the sensing scan signal SCAN_S [Rx] approaches a maximal level has elapsed.

In this manner, it is preferable for the detection switch SWd included in the defect detection circuit 180 to be turned on after the settling time Ts has elapsed from the time at which the sensing scan signal SCAN_S[Tx] is generated at the output node of the first gate driving circuit 120*a*, and to compare the received sensing scan signal SCAN_S[Rx] with the reference voltage Vref.

Figure 17:
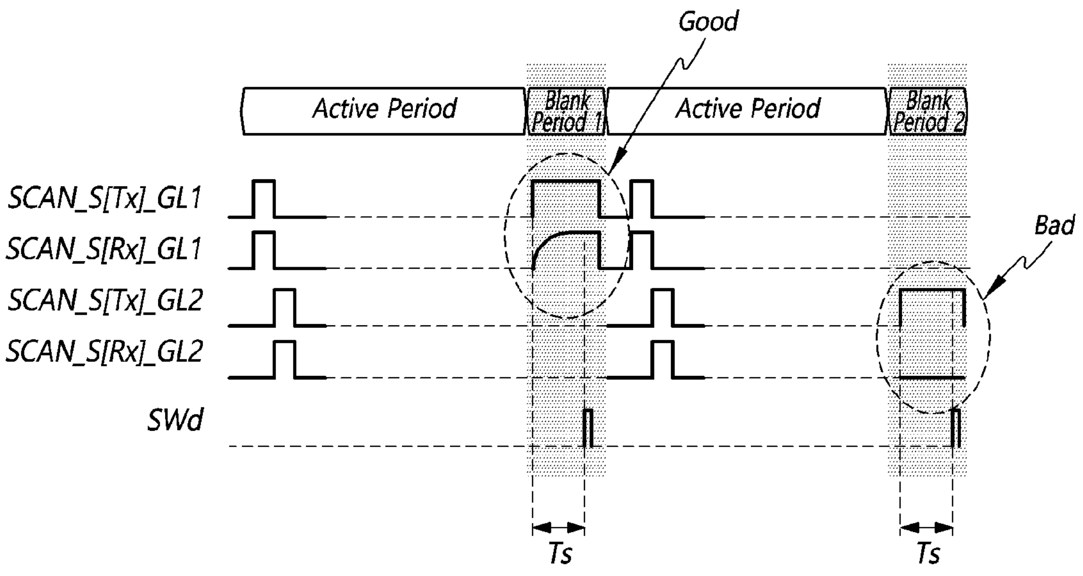
FIG. 17 illustrates an example signal diagram related to a process of detecting a defect in the display panel in the display device according to aspects of the present disclosure.

FIG. 17 illustrates an example signal diagram related to a process of detecting a defect in the display panel 110 in the display device 100 according to aspects of the present disclosure.

Referring to FIGS. 3 and 17, in one or more embodiments, during a blank period in which the display device 100 operates in the defect detecting mode, the first gate driving circuit 120*a* located in a left edge of the display panel 110 may perform the sensing data writing operation of generating a sensing scan signal SCAN_S [Tx], and the second gate driving circuit 120*b* located in a right edge of the display panel 110 may perform the scan signal receiving operation of receiving the sensing scan signal SCAN_S [Rx].

For example, the first gate driving circuit 120*a* may output a sensing scan signal SCAN_S [Tx]_GL1 through an output node connected to a first gate line GL1 in a first blank period (Blank Period 1). The second gate driving circuit 120*b* may receive a sensing scan signal SCAN_S [Rx]_GL1 through an output node connected to the first gate line GL1 in the first blank period (Blank Period 1).

Considering a corresponding time delay, after a settling time Ts has elapsed from a time at which the sensing scan signal SCAN_S [Tx]_GL1 transitions to a high level at the output node of the first gate driving circuit 120*a* connected to the first gate line GL1, the defect detection circuit 180 may compare the sensing scan signal SCAN_S [Rx]_GL1 received at the output node of the second gate driving circuit 120*b* connected to the first gate line GL1 with the reference voltage Vref.

When the level of the sensing scan signal SCAN_S [Rx]_GL1 received by the second gate driving circuit 120*b* in the first blank period (Blank Period 1) is higher than the reference voltage Vref, the defect detection circuit 180 may determine that the sensing scan signal SCAN_S [Tx]_GL1 is normally transferred from the first gate driving circuit 120*a* to the second gate driving circuit 120*b*, and output a defect detection signal BDS with a low level.

Further, the first gate driving circuit 120*a* may output a sensing scan signal SCAN_S [Tx]_GL2 through an output node connected to a second gate line GL2 in a second blank period (Blank Period 2). The second gate driving circuit 120*b* may receive a sensing scan signal SCAN_S [Rx]_GL2 through an output node connected to the second gate line GL2 in the second blank period (Blank Period 2).

In a similar manner, considering a corresponding time delay, after a settling time Ts has elapsed from a time at which the sensing scan signal SCAN_S [Tx]_GL2 transitions to a high level at the output node of the first gate driving circuit 120*a* connected to the second gate line GL2, the defect detection circuit 180 may compare the sensing scan signal SCAN_S [Rx]_GL2 received at the output node of the second gate driving circuit 120*b* connected to the second gate line GL2 with the reference voltage Vref.

When a voltage level of the sensing scan signal SCAN_S [Rx]_GL2 received by the second gate driving circuit 120*b* in the second blank period (Blank Period 2) is lower than the reference voltage Vref, the defect detection circuit 180 may determine that the display panel 110 has a defect, and output a defect detection signal BDS with a high level.

In one or more embodiments, to reduce the influence of the sensing scan signal (SCAN_S [Tx]) output by the first gate driving circuit 120*a* on the display panel 110 during a blank period, the display device 100 according to aspects of the present disclosure may control a voltage level of the scan clock line 132 (see. FIG. 8) of the first gate driving circuit 120*a*.

Figure 18:
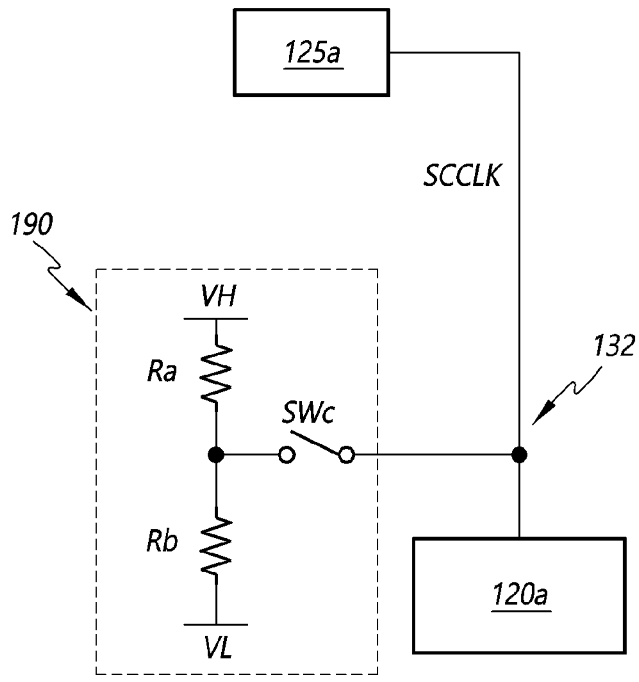
FIG. 18 illustrates an example configuration for controlling a voltage level applied to a scan clock line of the gate driving circuit in the display device according to aspects of the present disclosure.

FIG. 18 illustrates an example configuration for controlling a voltage level applied to a scan clock line of the gate driving circuit 120 in the display device 100 according to aspects of the present disclosure.

Referring to FIG. 18, in one or more embodiments, the first gate driving circuit 120*a* included in the display device 100 according to aspects of the present disclosure may further include a level control circuit 190 connected to the scan clock line 132.

The level control circuit 190 may include a level control switch SWc connected to the scan clock line 132, a first resistor Ra connected between the level control switch SWc and a first terminal or line to which a high voltage VH is applied or supplied, and a second resistor Rb connected between the level control switch SWc and a second terminal or line to which a low voltage VL is applied or supplied.

Therefore, the level of a voltage applied to the scan clock line 132 of the first gate driving circuit 120*a* may be controlled by controlling values of the first resistor Ra and the second resistor Rb and levels of the high voltage VH and low voltage VL.

In one or more embodiments, on-off switching of the level control switch SWc may be controlled at the same phase as a phase of a scan clock SCCLK applied to the first gate driving circuit 120*a*, or at a different phase from the phase of the scan clock SCCLK applied to the first gate driving circuit 120*a*.

Figure 19:
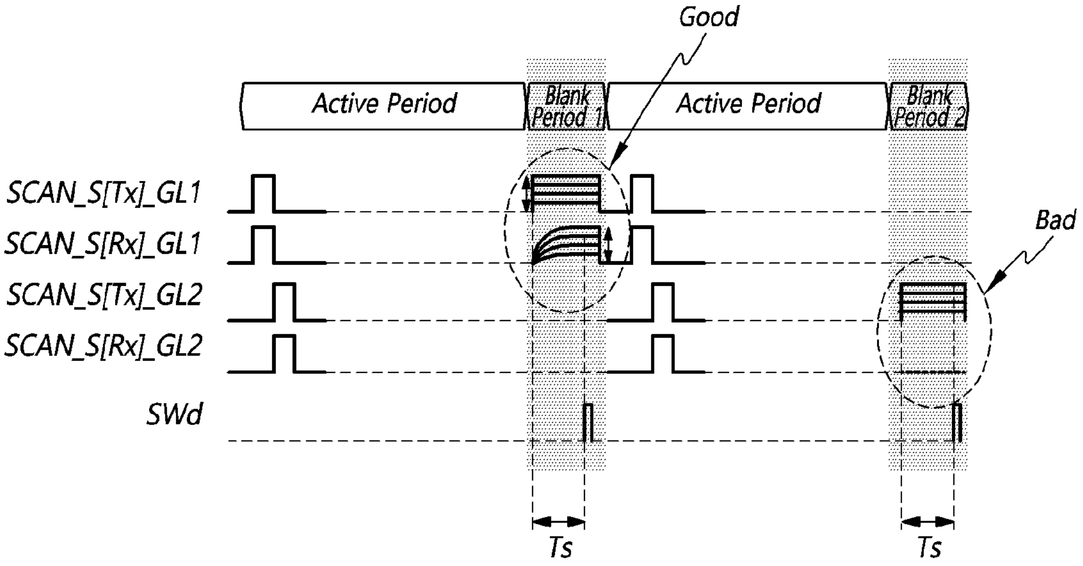
FIG. 19 illustrates an example signal diagram related to a process of detecting a defect in the display panel by controlling a voltage level applied to the scan clock line of the gate driving circuit in the display device according to aspects of the present disclosure.

FIG. 19 illustrates an example signal diagram related to a process of detecting a defect in the display panel 110 by controlling a voltage level applied to a scan clock line of the gate driving circuit 120 in the display device 100 according to aspects of the present disclosure.

Referring to FIGS. 3 and 19, in one or more embodiments, during a blank period in which the display device 100 operates in the defect detecting mode, the first gate driving circuit 120*a* located in a left edge of the display panel 110 may perform the sensing data writing operation of generating a sensing scan signal SCAN_S [Tx], and the second gate driving circuit 120*b* located in a right edge of the display panel 110 may perform the scan signal receiving operation of receiving a sensing scan signal SCAN_S [Rx].

For example, the first gate driving circuit 120*a* may output a sensing scan signal SCAN_S [Tx]_GL1 through an output node connected to a first gate line GL1 in a first blank period (Blank Period 1). The second gate driving circuit 120*b* may receive a sensing scan signal SCAN_S [Rx]_GL1 through an output node connected to the first gate line GL1 in the first blank period (Blank Period 1).

For example, a level of the sensing scan signal SCAN_S [Tx]_GL1 output through the output node of the first gate driving circuit 120*a* connected to the first gate line GL1 may be controlled by the level control circuit 190. In this manner, when the level of the sensing scan signal SCAN_S [Tx]_GL1 output through the output node of the first gate driving circuit 120*a* is changed, a level of the sensing scan signal (SCAN_S [Rx]_GL1) received through the output node of the second gate driving circuit 120*b* connected to the first gate line GL1 may be also changed. In this case, the level of the reference voltage Vref of the defect detection circuit 180 may be also changed.

Meanwhile, when the level of the sensing scan signal SCAN_S [Tx]_GL1 output through the output node of the first gate driving circuit 120*a* corresponds to a turn-on level capable of turning on transistors, one or more corresponding light emitting elements ED may emit light, and therefore, there may be caused a phenomenon in which horizontal lines appear in some areas in a blank period.

To address this issue, for example, it is preferable for the level of the sensing scan signal (SCAN_S [Tx]_GL1) output by the first gate driving circuit 120*a* to be maintained at a turn-off level in a blank period while operating in the defect detecting mode.

In another example, when the first gate driving circuit 120*a* outputs the sensing scan signal SCAN_S [Tx]_GL1 with the turn-on level in a blank period while operating in the bad detection mode, a change in luminance may be reduced by applying a restoring data voltage having the same level as a data voltage Vdata applied in a preceding frame or a data voltage Vdata to be applied in a following frame.

Considering a corresponding time delay, after a settling time Ts has elapsed from a time at which the sensing scan signal SCAN_S [Tx]_GL1 transitions to a high level at the output node of the first gate driving circuit 120*a* connected to the first gate line GL1, the defect detection circuit 180 may compare the sensing scan signal SCAN_S [Rx]_GL1 received at the output node of the second gate driving circuit 120*b* connected to the first gate line GL1 with the reference voltage Vref.

Based on a result of the comparison, when the level of the sensing scan signal SCAN_S [Rx]_GL1 received by the second gate driving circuit 120*b* in the first blank period (Blank Period 1) is higher than the reference voltage Vref, the defect detection circuit 180 may determine that the sensing scan signal SCAN_S [Tx]_GL1 is normally transferred from the first gate driving circuit 120*a* to the second gate driving circuit 120*b*, and output a defect detection signal BDS with a low level.

Further, the first gate driving circuit 120*a* may output a sensing scan signal SCAN_S [Tx]_GL2 through an output node connected to a second gate line GL2 in a second blank period (Blank Period 2). The second gate driving circuit 120*b* may receive a sensing scan signal SCAN_S [Rx]_GL2 through an output node connected to the second gate line GL2 in the second blank period (Blank Period 2).

For example, a level of the sensing scan signal SCAN_S [Tx]_GL2 output through the output node of the first gate driving circuit 120*a* connected to the second gate line GL2 may be controlled by the level control circuit 190. In this manner, when the level of the sensing scan signal SCAN_S [Tx]_GL2 output through the output node of the first gate driving circuit 120*a* is changed, a level of the sensing scan signal (SCAN_S [Rx]_GL2) received through the output node of the second gate driving circuit 120*b* connected to the second gate line GL2 may be also changed.

In a similar manner, considering a corresponding time delay, after a settling time Ts has elapsed from a time at which the sensing scan signal SCAN_S [Tx]_GL2 transitions to a high level at the output node of the first gate driving circuit 120*a* connected to the second gate line GL2, the defect detection circuit 180 may compare the sensing scan signal SCAN_S [Rx]_GL2 received at the output node of the second gate driving circuit 120*b* connected to the second gate line GL2 with the reference voltage Vref.

When a voltage level of the sensing scan signal SCAN_S [Rx]_GL2 received by the second gate driving circuit 120*b* in the second blank period (Blank Period 2) is lower than the reference voltage Vref, the defect detection circuit 180 may determine that the display panel 110 has a defect, and output a defect detection signal BDS with a high level.

As discussed above, in the double bank structure in which gate driving circuits 120, for example, first and second gate driving circuits (120*a* and 120*b*) are disposed in both edges of the display panel 110, during a blank period in which the display panel 110 does not emit light, defects in the display panel 110 may be detected in real time by enabling the first gate driving circuit 120*a* located in a first edge of the display panel 110 to perform the sensing data writing operation, and the second gate driving circuit 120*b* located in a second edge of the display panel 110 to perform the scan signal receiving operation.

The embodiments described above will be briefly described as follows.

According to the embodiments described herein, the display device 100 may be provided that includes: the display panel 110 in which a plurality of gate lines GL are arranged in a first direction, and a plurality of subpixel arrays each including a plurality of subpixels SP are arranged in the first direction; the gate driving circuit 120 including the first gate driving circuit 120*a* located in one edge of the display panel 110 and the second gate driving circuit 120*b* located in another edge of the display panel 110, the first gate driving circuit 120*a* and the second gate driving circuit 120*b* sharing one gate line GL connected to one subpixel array; and the timing controller 140 for controlling the gate driving circuit 120 to operate in a defect detecting mode to detect a defect in the display panel 110 during one or more blank periods in which the subpixels SP of the display panel 110 do not emit light.

In the defect detecting mode, the first gate driving circuit 120*a* may supply a sensing scan signal SCAN_S for sensing one or more characteristic values of a subpixel SP, and the second gate driving circuit 120*b* may receive the sensing scan signal SCAN_S supplied by the first gate driving circuit 120*a*.

The second gate driving circuit 120*b* may include one or more selection switches SWs for switching off a scan clock SCCLK supplied to the scan clock line 132.

The second gate driving circuit 120*b* may transfer the received sensing scan signal SCAN_S [Rx] through the scan clock line 132.

The display device 100 may further include the defect detection circuit 180 configured to compare the sensing scan signal SCAN_S[Rx] transferred by the second gate driving circuit 120*b* with a reference voltage, and detect a defect in the display panel 110.

The defect detection circuit 180 may include a detection switch SWd for determining a detection time of the sensing scan signal SCAN_S[Rx] transferred by the second gate driving circuit 120*b*, an amplifier AMP including a non-inverting input terminal to which a reference voltage is applied, an inverting input terminal, and an output terminal, an input resistor Rin connected to the inverting input terminal, and a feedback resistor Rfb connected between the inverting input terminal and the output terminal.

The detection switch SWd may be turned on after a settling time Ts has elapsed from a time at which the sensing scan signal SCAN_S [Tx] output at an output node of the first gate driving circuit 120*a* transitions to a high level.

The first gate driving circuit 120*a* may further include the level control circuit 190 for controlling a voltage level of the scan clock line 132.

The level control circuit 190 may include a level control switch SWc connected to the scan clock line 132, a first resistor Ra connected between the level control switch SWc and a first terminal or line to which a high voltage VH is applied or supplied, and a second resistor Rb connected between the level control switch SWc and a second terminal or line to which a low voltage VL is applied or supplied.

In the defect detecting mode, a voltage of the scan clock line may equal to, or correspond to, a level at which a corresponding subpixel may be turned off.

In the defect detecting mode, a voltage of the scan clock line may include a first level for turning on a corresponding subpixel and a second level to recovery a data voltage in a preceding frame or in a following frame.

The timing controller 140 may control the first gate driving circuit 120*a* and the second gate driving circuit 120*b* to perform an image data driving operation during an active period where the subpixels SP of the display panel 110 emit light.

According to the embodiments described herein, the gate driving circuit 120 for driving the display panel 110 in which a plurality of gate lines GL are arranged in a first direction, and a plurality of subpixel arrays each including a plurality of subpixels SP are arranged in the first direction may be provided that includes: the first gate driving circuit 120*a* connected to one gate line GL connected to one or more subpixels SP included in one subpixel array and located in one edge of the display panel 110; and the second gate driving circuit 120*b* sharing the one gate line GL with the first gate driving circuit 120*a* and located in another edge of the display panel 110, wherein the first and second gate driving circuits (120*a* and 120*b*) operate in a defect detecting mode to detect a defect in the display panel 110 during one or more blank periods in which the subpixels SP of the display panel do not emit light.

In the defect detecting mode, the first gate driving circuit 120*a* may supply a sensing scan signal SCAN_S for sensing one or more characteristic values of a subpixel SP, and the second gate driving circuit 120*b* may receive the sensing scan signal SCAN_S supplied by the first gate driving circuit 120*a*.

The second gate driving circuit 120*b* may include one or more selection switches SWs for switching off a scan clock SCCLK supplied to the scan clock line 132.

The second gate driving circuit 120*b* may transfer the received sensing scan signal SCAN_S [Rx] through the scan clock line 132.

The first gate driving circuit 120*a* may further include the level control circuit 190 for controlling a voltage level of the scan clock line 132.

The level control circuit 190 may include a level control switch SWc connected to the scan clock line 132, a first resistor Ra connected between the level control switch SWc and a first terminal or line to which a high voltage VH is applied or supplied, and a second resistor Rb connected between the level control switch SWc and a second terminal or line to which a low voltage VL is applied or supplied.

According to the embodiments described herein, the gate driving circuit 120 may be provided that include: the line selector 502 configured to charge an M node based on a carry signal of a preceding stage in response to an application of a line sensing signal LSP; the Q node controller 504 configured to charge a Q node to the level of a first high level gate voltage in response to the carry signal of the preceding stage, and to discharge the Q node to the level of a third low level gate voltage in response to an application of a carry signal of a following stage; the Q node stabilizer configured to discharge the Q node and a QH node to the level of the third low level gate voltage in response to a voltage of the QB node; the inverter 508 configured to change a voltage level of the QB node according to a voltage level of the Q node; the QB node stabilizer 510 configured to discharge the QB node to the level of the third low level gate voltage in response to the carry signal of the following stage, a reset signal, and a charging voltage of the M node; the carry signal generator 512 configured to output a carry signal based on a voltage level of a carry clock or the level of the third low level gate voltage according to the voltage level of the Q node or the voltage level of the QB node; and the scan signal generator 514 configured to output a plurality of scan signals based on a voltage level of a plurality of scan clocks or the level of a first low level gate voltage according to the voltage level of the Q node or the voltage level of the QB node.

In the defect detecting mode, the Q node in the second gate driving circuit 120*b* may be remained at a high level.

According to the embodiments described herein, the method of driving the display panel 110 in which a plurality of gate lines GL are arranged in a first direction, and a plurality of subpixel arrays each including a plurality of subpixels SP are arranged in the first direction may be provided that includes: in one or more active periods in which the subpixels SP of the display panel emit light, controlling the first gate driving circuit 120*a* located in one edge of the display panel 110 and the second gate driving circuit 120*b* located in another edge of the display panel 110 to perform an image data driving operation based on a configuration where one gate line GL connected to one or more subpixels SP included in one subpixel array is shared by the first and second gate driving circuits (120*a* and 120*b*); and during one or more blank periods in which the subpixels SP of the display panel 110 do not emit light, controlling the first and second gate driving circuits (120*a* and 120*b*) operate in a defect detecting mode to detect a defect in the display panel 110.

Operation in the defect detecting mode comprises supplying, by the first gate driving circuit 120*a*, a sensing scan signal SCAN_S for sensing one or more characteristic values of a subpixel SP, and receiving, by the second gate driving circuit 120*b*, the sensing scan signal SCAN_S supplied by the first gate driving circuit 120*a*.

The above description has been presented to enable any person skilled in the art to make, use and practice the technical features of the present disclosure, and has been provided in the context of a particular application and its requirements as examples. Various modifications, additions and substitutions to the described embodiments will be readily apparent to those skilled in the art, and the principles described herein may be applied to other embodiments and applications without departing from the scope of the present disclosure. The above description and the accompanying drawings provide examples of the technical features of the present disclosure for illustrative purposes only. That is, the disclosed embodiments are intended to illustrate the scope of the technical features of the present disclosure.

It will be apparent to those skilled in the art that various modifications and variations can be made in the display device, the gate driving circuit, and the display driving method of the present disclosure without departing from the spirit or scope of the aspects. Thus, it is intended that the present disclosure covers the modifications and variations of the aspects provided they come within the scope of the appended claims and their equivalents.

What is claimed is:

1. A display device comprising:

a display panel in which a plurality of gate lines are arranged in a first direction, and a plurality of subpixel arrays each comprising a plurality of subpixels are arranged in the first direction;

a first gate driving circuit configured to supply a display scan signal through a gate line during an active period in a first bezel area of the display panel, where the at least one of the plurality of subpixels of the display panel emits light in the active period;

a second gate driving circuit configured to supply the display scan signal through the gate line during the active period in a second bezel area of the display panel; and a timing controller configured to control the first gate driving circuit to supply a sensing scan signal through the gate line in a blank period of a defect detecting mode and control the second gate driving circuit to detect a defect in the display panel in which at least one of the plurality of subpixels of the display panel does not emit light using the sensing scan signal during the blank period of the defect detecting mode, wherein the second gate driving circuit receives the sensing scan signal through an output node of the second gate driving circuit and transfers the received sensing scan signal to a defect detection circuit through a scan clock line in the defect detecting mode.

2. The display device of claim 1, wherein, in the defect detecting mode, the first gate driving circuit performs a sensing data writing operation for sensing one or more characteristic values of the at least one of the plurality of subpixels, and the second gate driving circuit performs a scan signal receiving operation of receiving the sensing scan signal supplied by the first gate driving circuit.

3. The display device of claim 2, wherein the second gate driving circuit comprises one or more selection switches for switching off a scan clock supplied to the scan clock line.

4. The display device of claim 2, wherein the defect detection circuit compares the sensing scan signal transferred by the second gate driving circuit with a reference voltage and detect whether the display panel has a defect.

5. The display device of claim 4, wherein the defect detection circuit comprises:

a detection switch configured to determine a detection time of the sensing scan signal transferred by the second gate driving circuit;

an amplifier comprising a non-inverting input terminal to which a reference voltage is applied, an inverting input terminal, and an output terminal;

an input resistor connected to the inverting input terminal; and a feedback resistor connected between the inverting input terminal and the output terminal.

6. The display device of claim 5, wherein the detection switch is turned on after a settling time has elapsed from a time at which the sensing scan signal output at an output node of the first gate driving circuit transitions to a high level.

7. The display device of claim 2, wherein the first gate driving circuit further comprises: a level control circuit configured to control a voltage level of a scan clock line.

8. The display device of claim 7, wherein the level control circuit comprises:

a level control switch connected to the scan clock line;

a first resistor connected between the level control switch and a first terminal or line to which a high voltage is applied or supplied; and a second resistor connected between the level control switch and a second terminal or line to which a low voltage is applied or supplied.

9. The display device of claim 7, wherein in the defect detecting mode, a voltage of the scan clock line equals to, or corresponds to, a level at which a corresponding subpixel is turned off.

10. The display device of claim 7, wherein in the defect detecting mode, a voltage of the scan clock line comprises a first level for turning on a corresponding subpixel among the plurality of subpixels and a second level to recovery a data voltage in a preceding frame or in a following frame.

11. A gate driving circuit configured to drive a display panel in which a plurality of gate lines are arranged in a first direction, and a plurality of subpixel arrays each comprising a plurality of subpixels are arranged in the first direction, the gate driving circuit comprising:

a first gate driving circuit configured to supply a display scan signal through a gate line during an active period in a first bezel area of the display panel, where the at least one of the plurality of subpixels of the display panel emits light in the active period; and a second gate driving circuit configured to supply the display scan signal through the gate line during the active period in a second bezel area of the display panel; and wherein the first gate driving circuit supplies a sensing scan signal through the gate line in a blank period of a defect detecting mode and the second gate driving circuit detects a defect in the display panel in which at least one of the plurality of subpixels of the display panel does not emit light using the sensing scan signal during the blank period of the defect detecting mode, wherein the second gate driving circuit receives the sensing scan signal through an output node of the second gate driving circuit and transfers the received sensing scan signal to a defect detection circuit through a scan clock line in the defect detecting mode.

12. The gate driving circuit of claim 11, wherein, in the defect detecting mode, the first gate driving circuit performs a sensing data writing operation for sensing one or more characteristic values of the at least one of the plurality of subpixels, and the second gate driving circuit performs a scan signal receiving operation of receiving the sensing scan signal supplied by the first gate driving circuit.

13. The gate driving circuit of claim 12, wherein the second gate driving circuit comprises one or more selection switches for switching off a scan clock supplied to the scan clock line.

14. The gate driving circuit of claim 12, wherein the first gate driving circuit further comprises: a level control circuit for controlling a voltage level of a scan clock line.

15. The gate driving circuit of claim 14, wherein the level control circuit comprises:

a level control switch connected to the scan clock line;

a first resistor connected between the level control switch and a first terminal or line to which a high voltage is applied or supplied; and a second resistor connected between the level control switch and a second terminal or line to which a low voltage is applied or supplied.

16. The gate driving circuit of claim 11, wherein the gate driving circuit comprising:

a line selector configured to charge an M node based on a carry signal of a preceding stage in response to an application of a line sensing signal;

a Q node controller configured to charge a Q node to a level of a first high level gate voltage in response to the carry signal of the preceding stage, and to discharge the Q node to a level of a third low level gate voltage in response to an application of a carry signal of a following stage;

a Q node stabilizer configured to discharge the Q node and a QH node to the level of the third low level gate voltage in response to a voltage of a QB node;

an inverter configured to change a level of the voltage of the QB node based on a level of the voltage of the Q node;

a QB node stabilizer configured to discharge the QB node to the level of the third low level gate voltage in response to the carry signal of the following stage, a reset signal, and a charging voltage of the M node;

a carry signal generator configured to output a carry signal based on a voltage level of a carry clock or the level of the third low level gate voltage based on the level of the voltage of the Q node or the level of the voltage of the QB node; and a scan signal generator configured to output a plurality of scan signals based on a voltage level of a plurality of scan clocks or the level of a first low level gate voltage based on the level of the voltage of the Q node or the level of the voltage of the QB node.

17. The gate driving circuit of claim 16, wherein in the defect detecting mode, the Q node in the second gate driving circuit is remained at a high level.

18. A method of driving a display panel in which a plurality of gate lines are arranged in a first direction, and a plurality of subpixel arrays each comprising a plurality of subpixels are arranged in the first direction, the method comprising:

during an active period in which at least one of the plurality of the subpixels of the display panel emits light, controlling a first gate driving circuit located in a first edge of the display panel to supply a display scan signal through a gate line and a second gate driving circuit located in a second edge of the display panel to supply the display scan signal through the gate line; and during a blank period in which the at least one of the plurality of the subpixels of the display panel does not emit light, controlling the first gate driving circuit to supply a sensing scan signal through the gate line in a defect detecting mode and controlling the second gate driving circuit to receive the sensing scan signal through a output node of the second gate driving circuit and to transfer the received sensing scan signal to a defect detection circuit through a scan clock line in the defect detecting mode.

* * * * *